US008591678B2

(12) United States Patent
Suzuki

(10) Patent No.: US 8,591,678 B2
(45) Date of Patent: Nov. 26, 2013

(54) VACUUM FORMING MACHINE AND METHOD OF MAKING VACUUM FORMED PRODUCT

(75) Inventor: Yasuo Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 711 days.

(21) Appl. No.: 12/645,521

(22) Filed: Dec. 23, 2009

(65) Prior Publication Data

US 2010/0163155 A1 Jul. 1, 2010

(30) Foreign Application Priority Data

Dec. 26, 2008 (JP) ................................. 2008-333754

(51) Int. Cl.
*B32B 41/00* (2006.01)

(52) U.S. Cl.
USPC .............. 156/64; 156/212; 156/213; 156/245;
156/277; 156/285; 156/286; 156/308.2; 156/309.6;
156/350; 156/378; 156/379; 156/382; 156/583.3

(58) Field of Classification Search
USPC ........... 156/64, 350, 378, 379, 285, 286, 382,
156/583.3, 212, 213, 245, 277, 308.2, 309.6
See application file for complete search history.

(56) References Cited

U.S. PATENT DOCUMENTS 4,421,589 A * 12/1983 Armini et al. ................. 156/382

FOREIGN PATENT DOCUMENTS

| CN | 2681888 Y | 3/2005 |
|---|---|---|
| DE | 3109338 A1 | 9/1982 |
| DE | 102006045027 A1 * | 4/2008 |
| EP | 1 524 094 A1 | 4/2005 |
| JP | 57-167211 A | 10/1982 |
| JP | 63-214424 A | 9/1988 |
| JP | 03-150126 A | 6/1991 |
| JP | 03-184828 A | 8/1991 |
| JP | 04-288214 A | 10/1992 |
| JP | 07-040431 A | 2/1995 |
| JP | 08-011200 A | 1/1996 |
| JP | 09-239824 A | 9/1997 |
| JP | 2006-007422 A | 1/2006 |
| JP | 2008-279685 A | 11/2008 |

OTHER PUBLICATIONS

Official Communication issued in corresponding European Patent Application No. 09180672.9, mailed on Jun. 8, 2010.
Suzuki; "Vacuum Forming Machine and Method of Making Vacuum Formed Product"; U.S. Appl. No. 12/637,953; filed Dec. 15, 2009.
Suzuki; "Vacuum Forming Machine and Method of Making Vacuum Formed Product"; U.S. Appl. No. 12/645,522; filed Dec. 23, 2009.

* cited by examiner

*Primary Examiner* — Katarzyna Wyrozebski Lee
*Assistant Examiner* — Joshel Rivera
(74) *Attorney, Agent, or Firm* — Keating & Bennett, LLP

(57) ABSTRACT

A vacuum forming machine includes a holder arranged to hold a decorative sheet, upper and lower boxes separated by the decorative sheet and the holder, a pressure reducer arranged to reduce pressures inside the upper and lower boxes, a first valve arranged to adjust a degree of pressure reduction inside the upper box, a second valve arranged to adjust a degree of pressure reduction inside the lower box, a heater arranged to heat the decorative sheet, a temperature information collector arranged to collect temperature information about the temperature of the decorative sheet, and a controller programmed to control opening/closing operations of the first and second valves by reference to the temperature information while the pressure reducer is operating.

10 Claims, 16 Drawing Sheets

VACUUM FORMING MACHINE AND METHOD OF MAKING VACUUM FORMED PRODUCT

BACKGROUND OF THE INVENTION

1. Field of the Invention

The present invention relates to a vacuum forming machine for attaching a decorative sheet onto a base member under a reduced pressure and also relates to a method of making such a vacuum formed product.

2. Description of the Related Art

Recently, it was proposed, as an alternative decorating technique to painting, that a decorative sheet be attached to the surface of a base member. A base member decorated with a decorative sheet can be recycled more easily than a painted one. In addition, the decorated member can have a different type of fine appearance from that of a painted one, thus contributing to improving its decorativeness, too.

FIG. 17 illustrates an example of a decorative sheet. The decorative sheet 10 shown in FIG. 17 includes a decoration layer 1 and a supporting layer 2 that supports the decoration layer 1. Examples of the decoration layer 1 include an ink layer that has been formed by printing and a metal layer that has been formed by depositing a metallic material. The supporting layer 2 is made of a resin material such as polyvinyl chloride (PVC). When the decorative sheet 10 is attached onto the base member, an adhesive is applied onto the surface of the decorative sheet 10.

Such a decorative sheet 10 is attached onto a base member while the decorative sheet 10 is being formed under a reduced pressure so as to trace the surface shape of the base member. A vacuum forming machine for forming and attaching a decorative sheet in this manner is disclosed in Japanese Patent Application Laid-Open Publications No. 2006-7422 and No. 63-214424, for example.

FIG. 18 illustrates a vacuum forming machine (reduced pressure coating system) 500 as disclosed in Japanese Patent Application Laid-Open Publication No. 2006-7422. The vacuum forming machine 500 includes a chamber box 521, in which the internal pressure can be increased and decreased adaptively. The chamber box 521 consists of an upper chamber box 522 and a lower chamber box 524.

Inside the upper chamber box 522, a heater 528 is arranged for heating a decorative sheet (skin member) 10. On the other hand, a table 509 for mounting a base member (core member) 16 is arranged inside the lower chamber box 524. The upper and lower chamber boxes 522 and 524 are connected to a vacuum tank 507 and a compressed air tank 508.

Now, it will be described how to attach the decorative sheet 10 using such a vacuum forming machine 500.

First of all, as shown in FIG. 18, the base member 16 is mounted on the table 509 inside the lower chamber box 524 and then the decorative sheet 10 is put on the upper surface of the lower chamber box 524.

Next, as shown in FIG. 19, the upper chamber box 522 is lowered, thereby bringing the upper and lower chamber boxes 522 and 524 into contact with each other with the decorative sheet 10 sandwiched between them. As a result, the upper and lower chamber boxes 522 and 524 are closed airtight.

Subsequently, as shown in FIG. 20, the upper and lower chamber boxes 522 and 524 are evacuated by establishing communication with the vacuum tank 507, thereby creating a reduced pressure state (a near-vacuum very low pressure state) inside the upper and lower chamber boxes 522 and 524.

Thereafter, as shown in FIG. 21, the decorative sheet 10 is heated with the heater 528. This heating process is carried out to the point that the decorative sheet 10 softens so much that the adhesive applied on the surface of the decorative sheet 10 has a sufficient degree of adhesiveness.

Then, as shown in FIG. 22, the table 509 inside the lower chamber box 524 is raised, thereby bringing the base member 16 into contact with the decorative sheet 10.

Next, as shown in FIG. 23, the pressure inside the upper chamber box 522 is restored to the atmospheric pressure (with the reduced pressure still maintained in the lower chamber box 524), thereby causing the decorative sheet 10 to be pressed against the base member 16 and formed so as to trace the surface shape of the base member 16 by taking advantage of the pressure difference between the upper and lower chamber boxes 522 and 524.

In this process step, if compressed air is introduced into the upper chamber box 522 by making the upper chamber box 522 communicate to the compressed air tank 508, the decorative sheet 10 is pressed more strongly against the base member 16.

Finally, as shown in FIG. 25, after the pressure inside the lower chamber box 524 is also restored to the atmospheric pressure, the upper chamber box 522 is raised and the base member 16 coated with the decorative sheet 10 is unloaded. In this manner, a vacuum formed product consisting of the base member 16 and the decorative sheet 10 attached to its surface can be obtained.

By performing such a vacuum forming process, even a base member with a great degree of surface unevenness can be decorated easily with a beautiful sheet.

In the vacuum forming machine 500 disclosed in Japanese Patent Application Laid-Open Publication No. 2006-7422, to prevent a hollow base member 16 from expanding and bursting or collapsing under the rising pressure inside the chamber box 521, there is a communication hole 504 that maintains communication between the inside of the base member 16 and the upper chamber 522. If the base member 16 is not a hollow one, however, a normal vacuum forming process may be carried out without using such a communication hole 504.

With the vacuum forming machine 500 disclosed in Japanese Patent Application Laid-Open Publication No. 2006-7422, however, when heated, the decorative sheet 10 will soften and sag down as indicated by the dashed curve in FIG. 21. If the forming process were carried out with the decorative sheet 10 sagged in this manner, then the decorative sheet 10 attached would slightly shift from its intended position, thus ruining its appearance (e.g., misaligning the pattern of the decoration layer 1). A similar problem will arise even when a vacuum forming machine (which is a picture applier) as disclosed in Japanese Patent Application Laid-Open Publication No. 63-214424 is used.

SUMMARY OF THE INVENTION

Preferred embodiments of the present invention prevent the appearance of a final vacuum formed product, which is obtained by a vacuum forming process using a decorative sheet, from being ruined.

A vacuum forming machine according to a preferred embodiment of the present invention is designed to attach a decorative sheet onto a base member under a reduced pressure. The vacuum forming machine preferably includes a holder arranged to hold the decorative sheet, upper and lower boxes separated by the decorative sheet and the holder, a pressure reducer arranged to reduce pressures inside the upper and lower boxes, a first valve arranged to adjust a degree of pressure reduction inside the upper box, a second valve arranged to adjust a degree of pressure reduction inside the lower box, a heater arranged to heat the decorative sheet, a temperature information collector arranged to collect temperature information about the temperature of the decorative sheet, and a controller programmed to control opening/closing operations of the first and second valves by reference to the temperature information while the pressure reducer is operating.

In a specific preferred embodiment, the temperature information collector preferably includes a temperature sensor arranged to sense the temperature of the decorative sheet.

In one preferred embodiment, the vacuum forming machine further includes a pressure information collector arranged to collect pressure information about the pressures inside the upper and lower boxes. The controller controls the opening/closing operations of the first and second valves by reference to the temperature information and the pressure information while the pressure reducer is operating.

In a specific preferred embodiment, the pressure information collector includes a plurality of pressure sensors arranged to sense the pressures inside the upper and lower boxes.

In another preferred embodiment, the controller is programmed to perform a first type of control that sets the pressure inside the lower box to be higher than the pressure inside the upper box. The controller starts to perform the first type of control after at least one of the pressures inside the upper and lower boxes has been reduced by the pressure reducer to less than a predefined pressure and when or before the temperature of the decorative sheet that has been raised by the heater reaches a first preset temperature, and continues to perform the first type of control until the temperature of the decorative sheet reaches a second preset temperature that is higher than the first preset temperature.

In this particular preferred embodiment, the controller performs the first type of control by increasing the degree of opening of the first valve and/or decreasing the degree of opening of the second valve compared to their respective degrees of opening before the first type of control is started.

In a specific preferred embodiment, the controller performs the first type of control so that the pressure inside the lower box becomes higher than the pressure inside the upper box by no less than about 0.05 kPa and no more than about 0.3 kPa, for example.

In another preferred embodiment, the controller is programmed to perform a second type of control so that a pressure difference between the upper and lower boxes becomes equal to or smaller than a predetermined value since the pressures have started to be reduced by the pressure reducer and until the first type of control is started.

In this particular preferred embodiment, the controller performs the second type of control so that the pressure difference between the upper and lower boxes becomes equal to or smaller than about 3 kPa, for example.

In still another preferred embodiment, the decorative sheet includes a decoration layer and a sheet base member that supports the decoration layer. The first temperature either falls within the range of about 20° C. through (Tg+20) ° C., where Tg ° C. is the glass transition temperature of the sheet base member as measured by differential thermal analysis, or is such a temperature that makes the storage modulus E' of the sheet base member, which is estimated by dynamic viscoelasticity measurement as defined by ISO 6721, fall within the range of about 10 kPa through about 100 MPa, for example.

In yet another preferred embodiment, after completing the first type of control, the controller performs a third type of control so that the pressure inside the upper box becomes higher than the pressure inside the lower box.

In an alternative preferred embodiment, the decorative sheet includes a decoration layer and a sheet base member that supports the decoration layer, and the second temperature falls within the range of approximately (Tg+25) ° C. through (Tg+70) ° C., where Tg ° C. is the glass transition temperature of the sheet base member as measured by differential thermal analysis.

In a specific preferred embodiment, the first and second valves preferably are motor valves.

A method of making a vacuum formed product according to another preferred embodiment of the present invention includes the steps of preparing a decorative sheet and attaching the decorative sheet onto a base member. The step of attaching includes the steps of heating the decorative sheet, and reducing the pressure in a first space between the decorative sheet and the base member and the pressure in a second space that spreads over the decorative sheet opposite to the first space. The step of attaching further includes the step of collecting temperature information about the temperature of the decorative sheet. The step of reducing is carried out by reference to the temperature information that has been collected in the step of collecting temperature information so that the degrees of pressure reduction in the first and second spaces are adjusted independently of each other.

In a specific preferred embodiment, the step of collecting temperature information includes sensing the temperature of the decorative sheet.

In another preferred embodiment, the step of attaching further includes the step of collecting pressure information about the pressures in the first and second spaces. The step of reducing is carried out by reference to the temperature information that has been collected in the step of collecting temperature information and the pressure information that has been collected in the step of collecting pressure information so that the degrees of pressure reduction in the first and second spaces are adjusted independently of each other.

In a specific preferred embodiment, the step of collecting pressure information includes sensing the pressures in the first and second spaces.

In another preferred embodiment, the step of reducing includes a first adjusting step for adjusting the degrees of pressure reduction in the first and second spaces so that the pressure in the first space becomes higher than the pressure in the second space. The first adjusting step is started after at least one of the pressures in the first and second spaces has been reduced to less than a predefined pressure by starting the step of reducing and when or before the temperature of the decorative sheet reaches a first preset temperature by starting the step of heating, and is continued until the temperature of the decorative sheet reaches a second preset temperature that is higher than the first preset temperature.

In a specific preferred embodiment, the first adjusting step includes setting the pressure in the first space to be higher than the one in the second space by no less than about 0.05 kPa and no more than about 0.3 kPa, for example.

In this particular preferred embodiment, the step of reducing includes a second adjusting step for adjusting the degrees of pressure reduction in the first and second spaces so that a pressure difference between the first and second spaces becomes equal to or smaller than a predetermined value since the step of reducing has been started and until the first adjusting step is started.

In a specific preferred embodiment, the second adjusting step includes reducing the pressure difference between the first and second spaces to be about 3 kPa or less, for example.

In still another preferred embodiment, the decorative sheet includes a decoration layer and a sheet base member that supports the decoration layer. The first temperature falls within the range of approximately 20° C. through (Tg+20) ° C., where Tg ° C. is the glass transition temperature of the sheet base member as measured by differential thermal analysis.

In an alternative preferred embodiment, the decorative sheet includes a decoration layer and a sheet base member that supports the decoration layer, and the second temperature falls within the range of approximately (Tg+25) ° C. through (Tg+70) ° C., where Tg ° C. is the glass transition temperature of the sheet base member as measured by differential thermal analysis.

A vacuum forming machine according to an additional preferred embodiment of the present invention includes a temperature information collector arranged to collect temperature information about the temperature of a decorative sheet. The machine further includes a controller programmed to control the opening/closing operations of first and second valves by reference to the temperature information that has been collected by the temperature information collector while a pressure reducer is operating. Thus, the machine can control the opening/closing operations of the first and second valves according to the temperature of the decorative sheet and thereby adjust the pressures inside the upper and lower boxes independently of each other. As a result, the appearance of a resultant vacuum formed product is never ruined due to sagging of the decorative sheet. In addition, since the pressures inside the upper and lower boxes can be adjusted independently of each other, the upper and lower boxes may have mutually different volumes. In other words, there is no need to make the volumes of the upper and lower boxes equal to each other. Consequently, the overall size of the vacuum forming machine can be reduced. On top of that, as there is no need to provide two pressure reducers separately for the upper and lower boxes, respectively (i.e., only one vacuum pump may be used as the pressure reducer), the size can be further reduced.

The temperature of the decorative sheet is determined by reference to the temperature information that has been collected by the temperature information collector, which may be a temperature sensor arranged to sense the temperature of the decorative sheet, for example.

The vacuum forming machine according to a preferred embodiment of the present invention preferably further includes a pressure information collector arranged to collect pressure information about the pressures inside the upper and lower boxes. If the controller controls the opening/closing operations of the first and second valves by reference to not only the temperature information but also the pressure information while the pressure reducer is operating, the opening/closing operations of the first and second valves can be controlled according to the actual pressures inside the upper and lower boxes. As a result, the pressures inside the upper and lower boxes can be adjusted more effectively, thus preventing unwanted sagging of the decorative sheet from ruining the appearance of a final vacuum formed product.

The pressures inside the upper and lower boxes are determined by reference to pressure information that has been collected by the pressure information collector, which may be a plurality of pressure sensors arranged to sense the pressures inside the upper and lower boxes, for example.

Typically, the controller can perform a first type of control that sets the pressure inside the lower box to be higher than the pressure inside the upper box. By setting the pressure inside the lower box to be higher than the one inside the upper box, the decorative sheet that has softened under the heat can be held almost horizontally, thus minimizing sagging of the decorative sheet. That first type of control is preferably started after at least one of the pressures inside the upper and lower boxes has been reduced to less than a predefined pressure and when or before the temperature of the decorative sheet reaches a first preset temperature, and is preferably continued until the temperature of the decorative sheet reaches a second preset temperature that is higher than the first preset temperature. By starting the first type of control after the pressure(s) inside the upper and/or lower box(es) have/has been reduced sufficiently, the pressure difference between the upper and lower boxes can be defined appropriately.

The controller may perform the first type of control by increasing the degree of opening of the first valve compared to its degree of opening before the first type of control is started. Alternatively, the controller may also perform the first type of control by decreasing the degree of opening of the second valve compared to its degree of opening before the first type of control is started. Alternatively, the controller may even perform the first type of control by increasing the degree of opening of the first valve and decreasing the degree of opening of the second valve compared to their respective degrees of opening before the first type of control is started.

The first temperature is preferably somewhat lower than the best temperature for performing a vacuum forming process. Specifically, the first temperature falls within the range of approximately 20° C. through (Tg+20) ° C., where Tg ° C. is the glass transition temperature of the sheet base member as measured by differential thermal analysis, or is such a temperature that makes the storage modulus E' of the sheet base member, which is estimated by dynamic viscoelasticity measurement as defined by ISO 6721, fall within the range of about 10 kPa through about 100 MPa, for example.

It is preferred that the controller perform the first type of control so that the pressure inside the lower box becomes higher than the pressure inside the upper box by no less than about 0.05 kPa and no more than about 0.3 kPa, for example. The reason is as follows. Specifically, if the pressure difference between the lower and upper boxes were less than about 0.05 kPa, sagging of the decorative sheet could not be reduced sufficiently. However, if the pressure difference were greater than about 0.3 kPa, then the decorative sheet would swell too much to avoid ruining its appearance.

The controller preferably performs a second type of control so as to minimize the pressure difference between the upper and lower boxes (i.e., reduce their difference to a predetermined value or less) since the pressures have started to be reduced by the pressure reducer and until the first type of control is started.

Specifically, the controller preferably performs the second type of control so that the pressure difference between the upper and lower boxes becomes equal to or smaller than about 3 kPa. By setting the pressure difference to be about 3 kPa or less, pulsation due to the pressure difference can be reduced sufficiently.

Furthermore, after completing the first type of control, the controller preferably performs a third type of control so that the pressure inside the upper box becomes higher than the pressure inside the lower box. By setting the pressure inside the upper box to be higher than the pressure inside the lower box, the decorative sheet can be pressed strongly against the base member.

The second temperature is the best temperature for performing a vacuum forming process and may fall within the range of approximately (Tg+25) ° C. to (Tg+70) ° C.

The first and second valves are preferably a type of valves that are opened and closed with a motor (i.e., motor valves).

If the first and second valves are motor valves, the pressures inside the upper and lower boxes can be adjusted accurately enough.

In a method of making a vacuum formed product according to a preferred embodiment of the present invention, the step of attaching a decorative sheet onto a base member includes the steps of heating the decorative sheet and reducing the pressure in a first space between the decorative sheet and the base member and the pressure in a second space that spreads over the decorative sheet opposite to the first space. The step of attaching further includes the step of collecting temperature information about the temperature of the decorative sheet. Also, in the method of making a vacuum formed product according to a preferred embodiment of the present invention, the step of reducing is carried out by reference to the temperature information that has been collected in the step of collecting temperature information so that the degrees of pressure reduction in the first and second spaces are adjusted independently of each other. Thus, it is possible to prevent sagging of the decorative sheet from ruining the appearance of a final vacuum formed product.

The temperature of the decorative sheet is determined by reference to the temperature information that has been collected in the step of collecting temperature information, in which the temperature of the decorative sheet is sensed, for example.

The step of attaching preferably further includes the step of collecting pressure information about the pressures in the first and second spaces. If the step of reducing is carried out by reference to not only the temperature information but also the pressure information so that the degrees of pressure reduction in the first and second spaces are adjusted independently of each other, it is possible to prevent more reliably unwanted sagging of the decorative sheet from ruining the appearance of a final vacuum formed product.

The pressures in the first and second spaces are determined by reference to the pressure information that has been collected in the step of collecting pressure information, in which the pressures in the first and second spaces may be sensed, for example.

The step of reducing typically includes a first adjusting step for adjusting the degrees of pressure reduction in the first and second spaces so that the pressure in the first space becomes higher than the pressure in the second space. By setting the pressure in the first space to be higher than the one in the second space, the decorative sheet that has softened under the heat can be held almost horizontally, thus minimizing sagging of the decorative sheet. The first adjusting step is preferably started after at least one of the pressures in the first and second spaces has been reduced to less than a predefined pressure and when or before the temperature of the decorative sheet reaches a first preset temperature, and is preferably continued until the temperature of the decorative sheet reaches a second preset temperature that is higher than the first preset temperature. By starting the first adjusting step after the pressure(s) in the first and/or second space(s) have/has been reduced sufficiently, the pressure difference between the first and second spaces can be defined appropriately.

The first temperature is somewhat lower than the best temperature for performing a vacuum forming process. Specifically, the first temperature falls within the range of approximately 20° C. through (Tg+20) ° C., where Tg ° C. is the glass transition temperature of the sheet base member as measured by differential thermal analysis, or is such a temperature that makes the storage modulus E' of the sheet base member, which is estimated by dynamic viscoelasticity measurement as defined by ISO 6721, fall within the range of about 10 kPa through about 100 MPa, for example.

The first adjusting step is preferably performed so that the pressure in the first space becomes higher than the one in the second space by no less than about 0.05 kPa and no more than about 0.3 kPa, for example. The reason is as follows. Specifically, if the pressure difference between the first and second spaces were less than about 0.05 kPa, sagging of the decorative sheet could not be reduced sufficiently. However, if the pressure difference were greater than about 0.3 kPa, then the decorative sheet would swell too much to avoid ruining its appearance.

The step of reducing preferably includes a second adjusting step for adjusting the degrees of pressure reduction in the first and second spaces so that a pressure difference between the first and second spaces is minimized (i.e., becomes equal to or smaller than a predetermined value) since the step of reducing has been started and until the first adjusting step is started.

Specifically, the second adjusting step is preferably performed so that the pressure difference between the first and second spaces becomes equal to or smaller than about 3 kPa. By setting the pressure difference to be about 3 kPa or less, pulsation due to the pressure difference can be reduced sufficiently.

The second temperature is the best temperature for performing a vacuum forming process and may fall within the range of approximately (Tg+25) ° C. to (Tg+70) ° C.

According to various preferred embodiments of the present invention, a vacuum formed product, which is made by vacuum forming process using a decorative sheet, prevents its appearance from being ruined.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It should be noted, however, that the present invention is in no way limited to the specific preferred embodiments to be described below.

Figure 1:
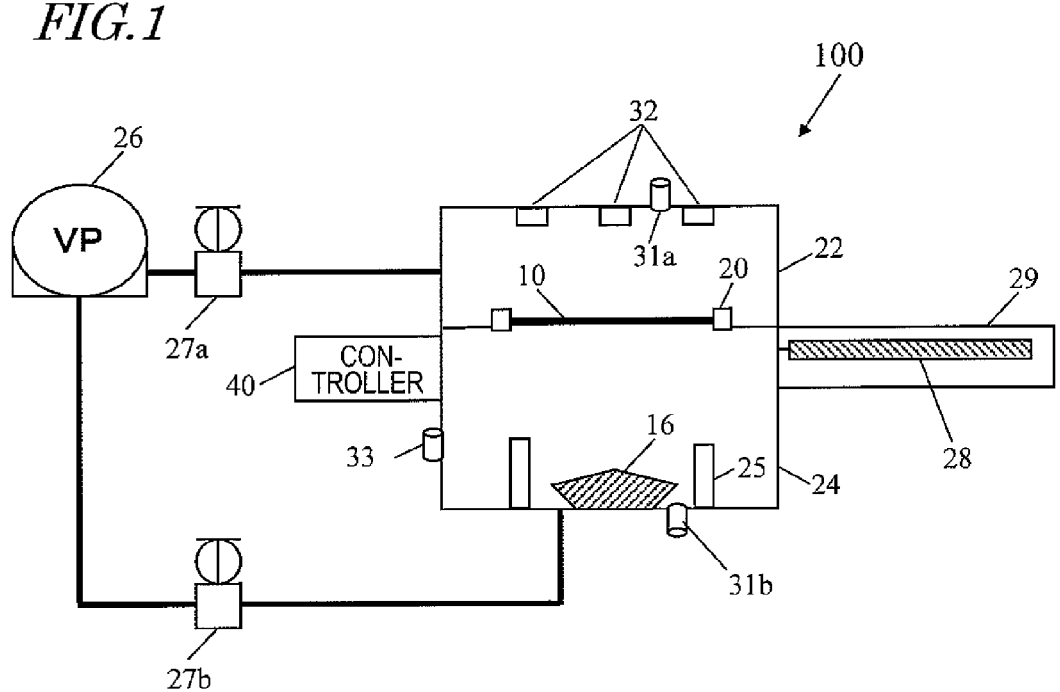
FIG. 1 schematically illustrates a vacuum forming machine 100 according to a preferred embodiment of the present invention.

FIG. 1 illustrates a vacuum forming machine 100 as a specific preferred embodiment of the present invention. In FIG. 1, a decorative sheet 10 and a base member 16 are also shown to make this description more easily understandable. The vacuum forming machine 100 is used to attach the decorative sheet 10 (which will be simply referred to herein as a "sheet") onto the base member 16 under a reduced pressure. That is to say, the vacuum forming machine 100 is an apparatus for making a vacuum formed product including the base member 16 and the decorative sheet 10 that has been attached onto the surface of the base member 16.

Figure 17:
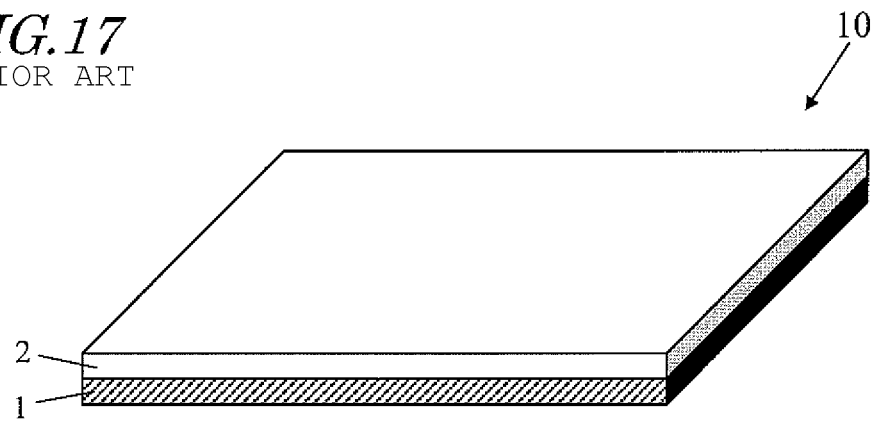
FIG. 17 illustrates an example of a decorative sheet 10.
Figure 18:
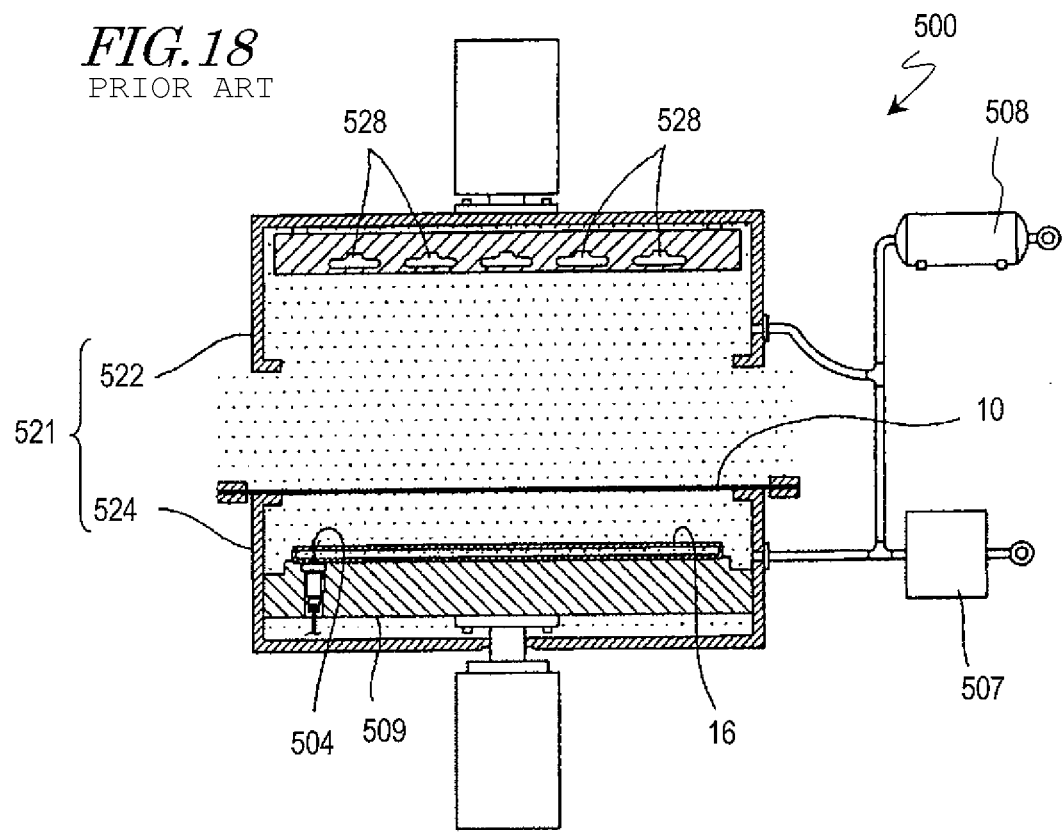
FIGS. 18 through 25 illustrate respective manufacturing process steps to make a vacuum formed product using a conventional vacuum forming machine 500.
Figure 19:
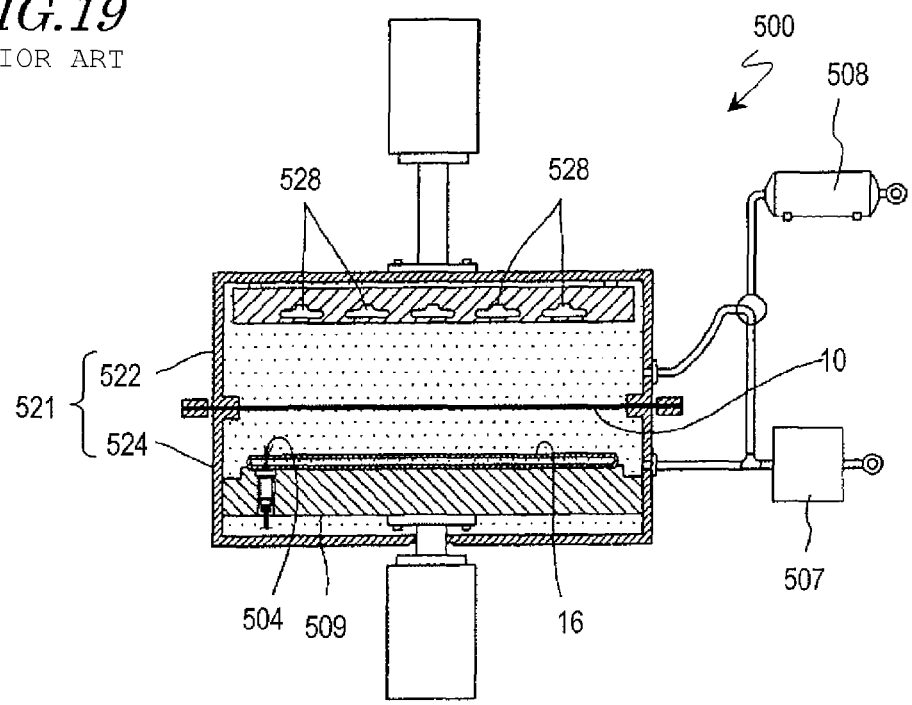
Figure 20:
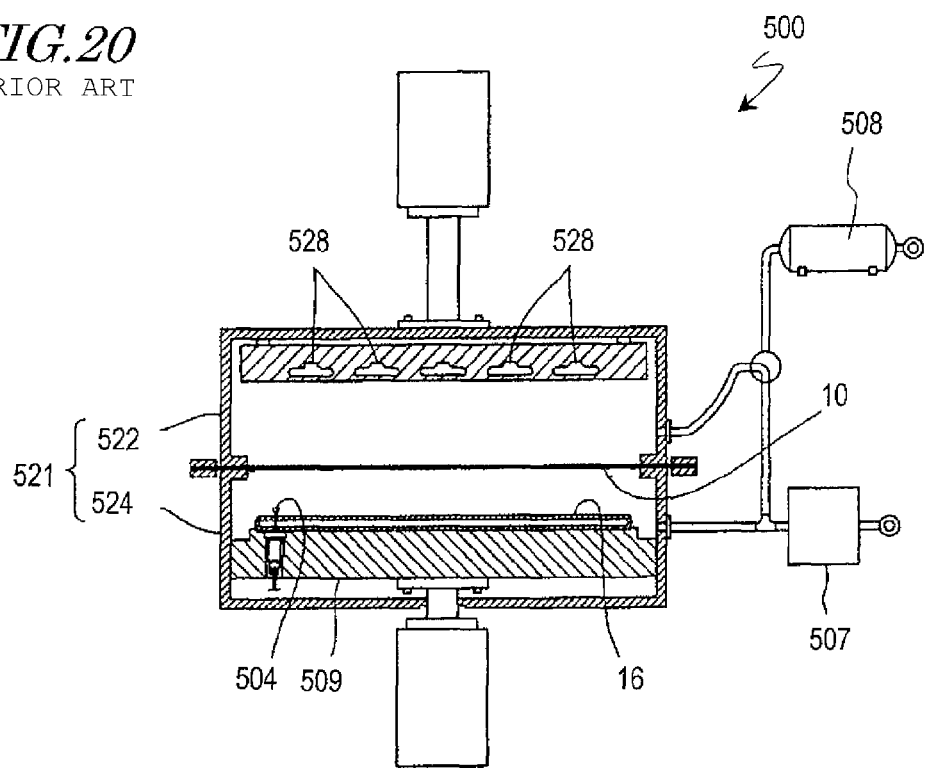
Figure 21:
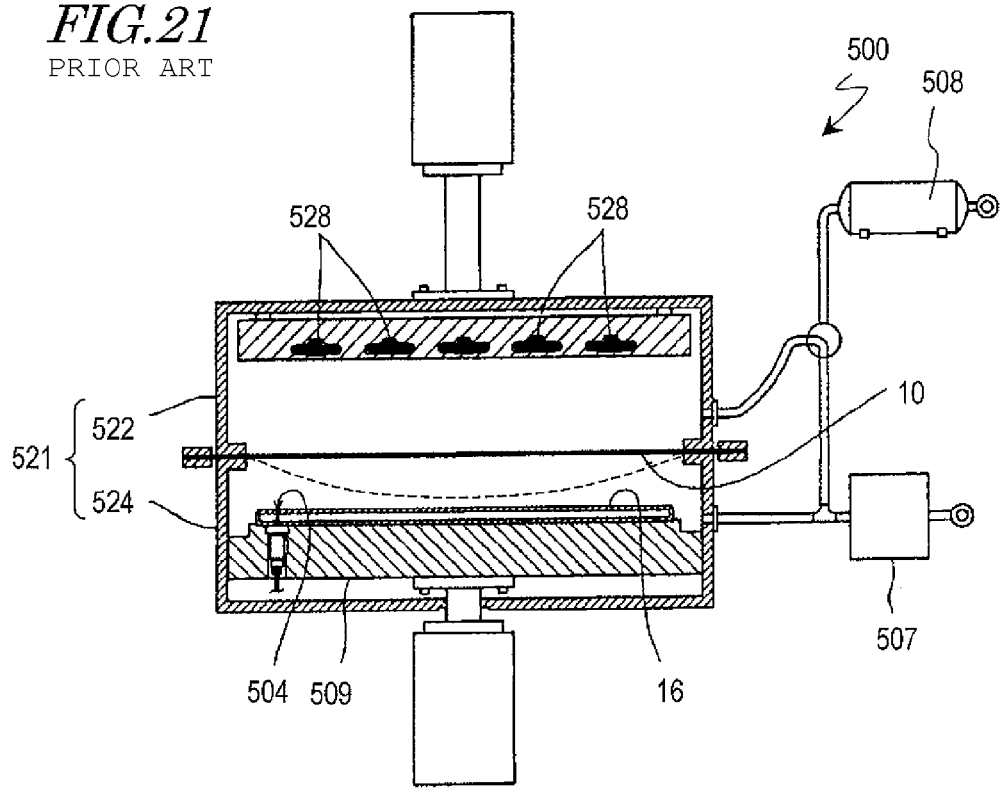
Figure 22:
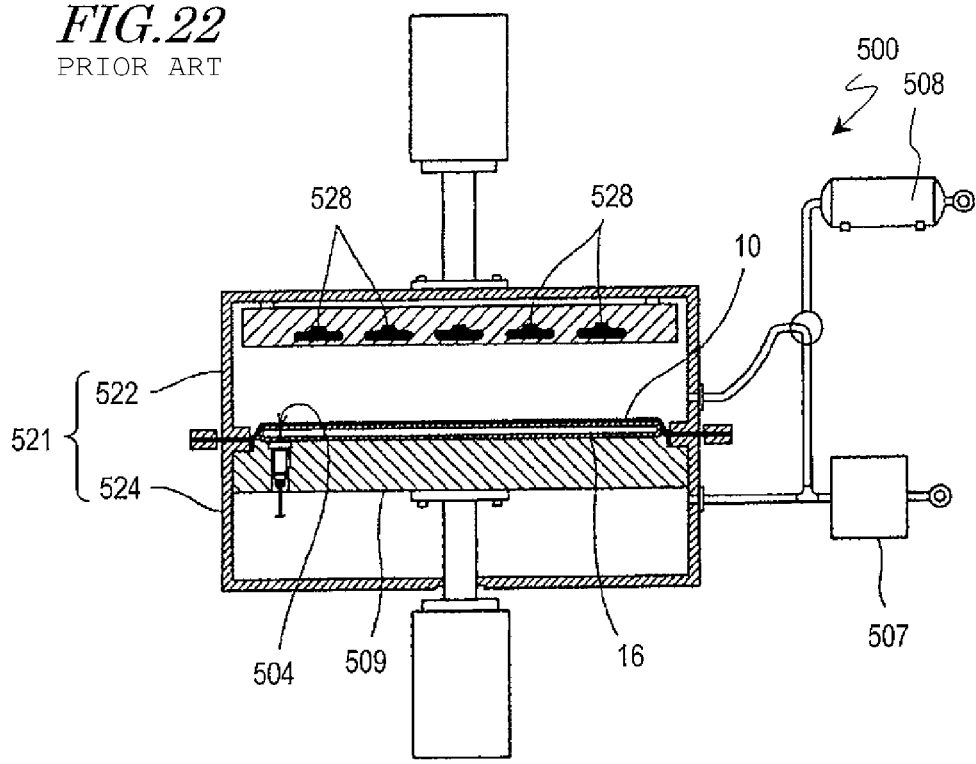
Figure 23:
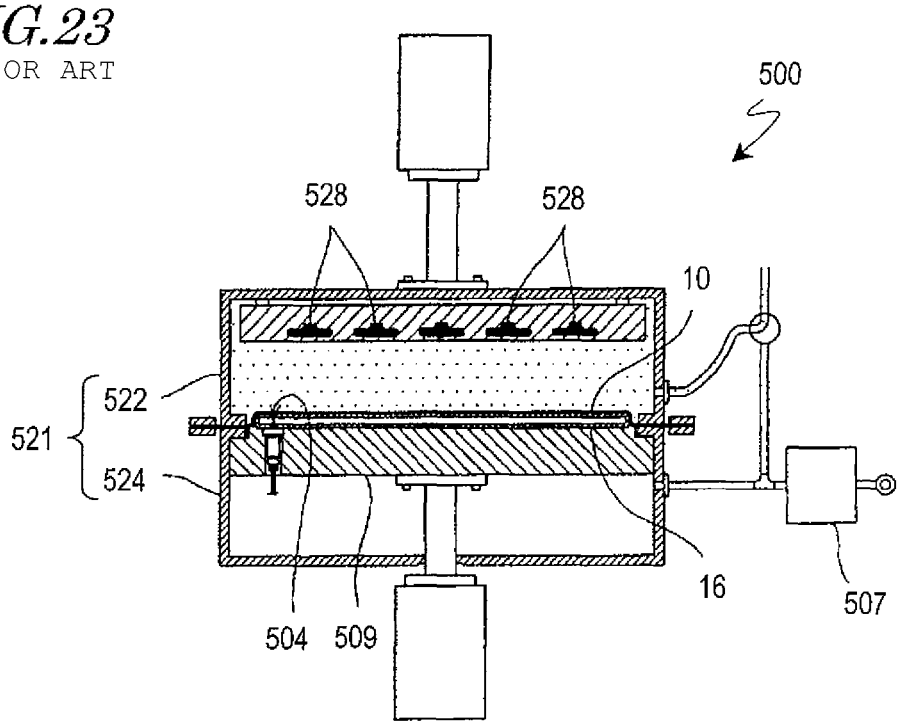
Figure 24:
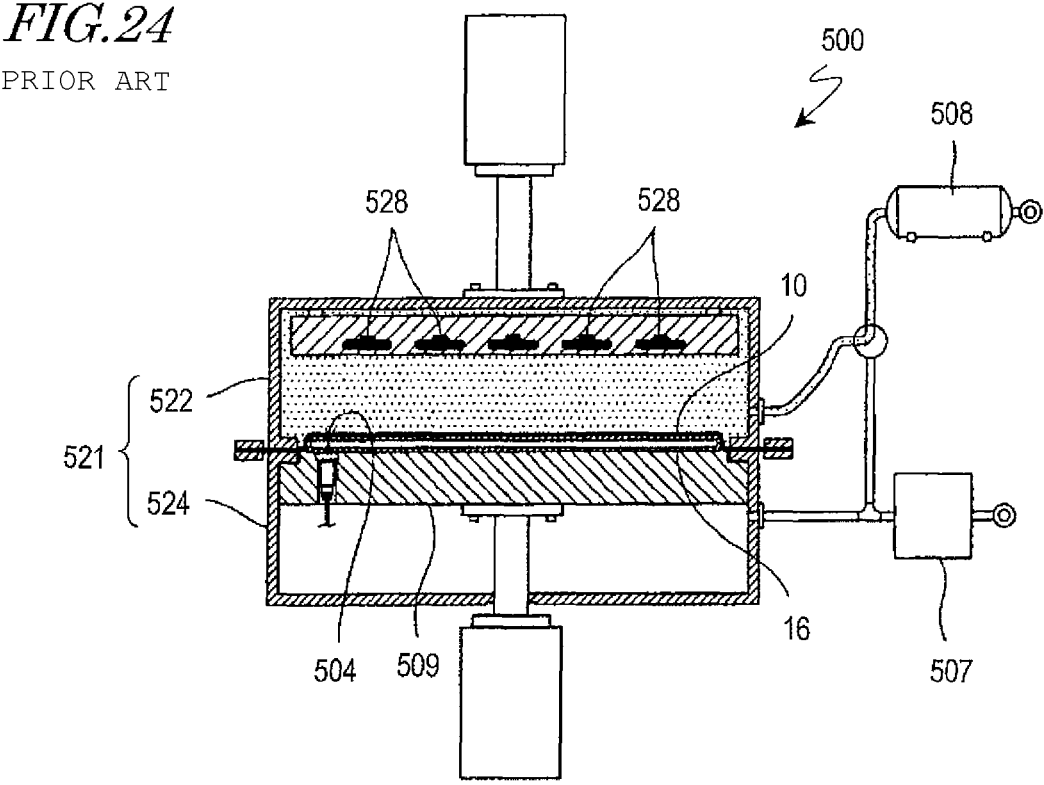
Figure 25:
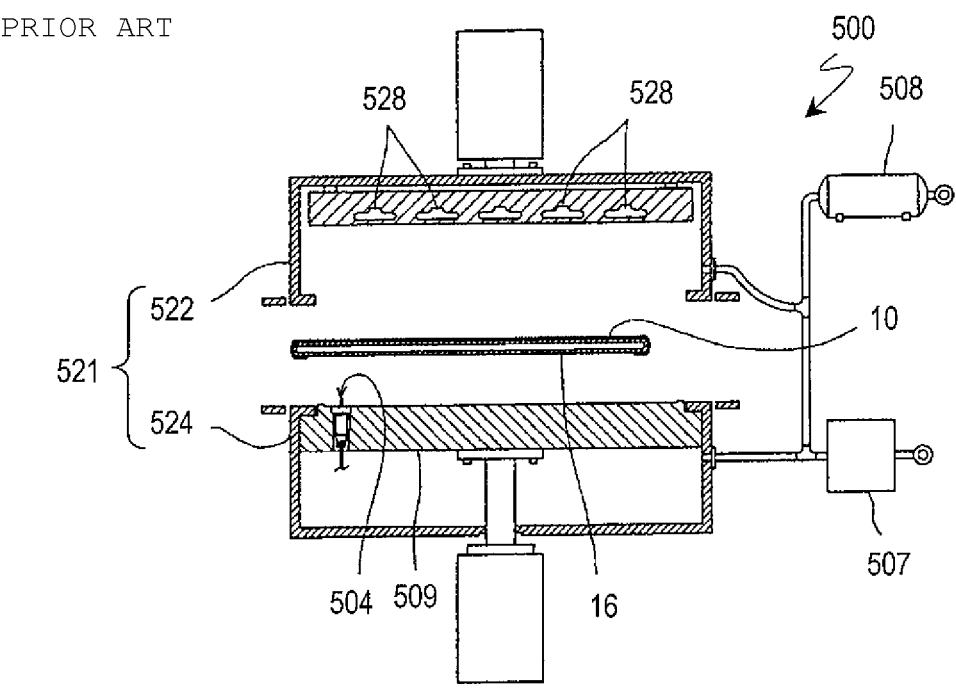

As already described with reference to FIG. 17, the decorative sheet 10 includes a decoration layer 1 and a supporting layer 2 that supports the decoration layer 1. The decoration layer 1 may be either an ink layer formed by printing or a metal layer formed by depositing a metallic material. The decoration layer 1 does not have to be a single layer but may also have a multilayer structure in which an ink layer, a metal layer, and other layers have been stacked one upon the other. The supporting layer 2 is preferably made of a resin material such as polycarbonate or polyethylene terephthalate. When the sheet 10 is attached onto the base member 16, an adhesive is applied onto the surface of the sheet 10. In the following description, the supporting layer 2 that forms the body of the sheet 10 will be referred to herein as a "sheet base member".

The base member 16 (which forms the body of the vacuum formed product) may be made of a resin material, a metallic material or any other suitable material. The base member 16 may be made by any known process, e.g., by injection molding process using a resin material.

As shown in FIG. 1, the vacuum forming machine 100 of this preferred embodiment includes a holder 20 arranged to hold the sheet 10 and upper and lower boxes 22 and 24, which are separated by the sheet 10 and the holder 20.

The holder 20 preferably is a ring-shaped (such as square ring) member that can hold and grip the periphery of the sheet 10. The upper box 22 has an opening at the bottom, while the lower box 24 has an opening at the top. And the base member 16 is put on the bottom surface of the lower box 24. In this preferred embodiment, a frame 25 is arranged inside the lower box 24 so as to surround the base member 16. But the frame 25 may be omitted.

The vacuum forming machine 100 further includes a pressure reducer 26 arranged to reduce the pressures inside the upper and lower boxes 22 and 24, a first valve 27a arranged to adjust the degree of pressure reduction inside the upper box 22, a second valve 27b arranged to adjust the degree of pressure reduction inside the lower box 24, and a heater 28 for heating the sheet 10.

The pressure reducer 26 is typically a vacuum pump. The first valve 27a is provided between the upper box 22 and the pressure reducer 26. On the other hand, the second valve 27b is provided between the lower box 24 and the pressure reducer 26.

The heater 28 may be a far infrared heater, for example. In this preferred embodiment, a heater box 29 that houses the heater 28 is arranged adjacent to the lower box 24. When heating the sheet 10, the heater 28 is introduced into the lower box 24.

The vacuum forming machine 100 further includes a pressure information collector arranged to collect pressure information about the pressures inside the upper and lower boxes 22 and 24, a temperature information collector arranged to collect temperature information about the temperature of the sheet 10, and a controller 40 programmed to control the opening/closing operations of the first and second valves 27a and 27b.

In this preferred embodiment, the pressure information collector preferably includes a plurality of pressure sensors 31a and 31b arranged to sense the pressures inside the upper and lower boxes 22 and 24. Specifically, those pressure sensors 31a and 31b include a first pressure sensor 31a arranged to sense the pressure inside the upper box 22 and a second pressure sensor 31b arranged to sense the pressure inside the lower box 24. The first pressure sensor 31a is attached to the upper box 22, while the second pressure sensor 31b is attached to the lower box 24.

On the other hand, the temperature information collector of this preferred embodiment preferably includes temperature sensors 32 arranged to sense the temperature of the sheet 10. The temperature sensors 32 may be infrared temperature sensors that can perform non-contact temperature sensing, for example. The temperature sensors 32 are arranged inside the upper box 22.

The vacuum forming machine 100 of this preferred embodiment further includes an atmospheric pressure sensor 33 arranged to sense the atmospheric pressure. In the example illustrated in FIG. 1, the atmospheric sensor 33 is preferably attached to the outer surface of the lower box 24. But the atmospheric pressure sensor 33 does not have to be located there.

Figure 2:
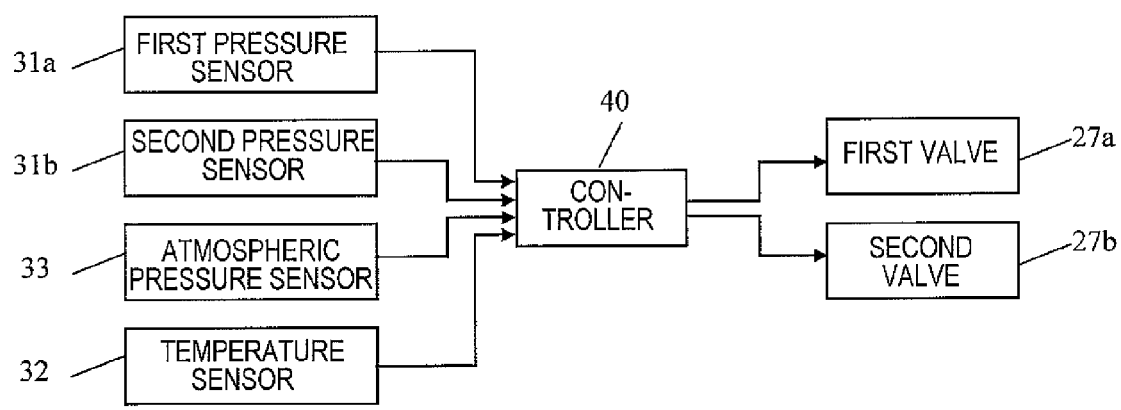
FIG. 2 is a block diagram schematically illustrating the arrangement of a controller, first and second pressure sensors, an atmospheric pressure sensor, a temperature sensor and first and second valves as respective members of the vacuum forming machine 100.
Figure 3:
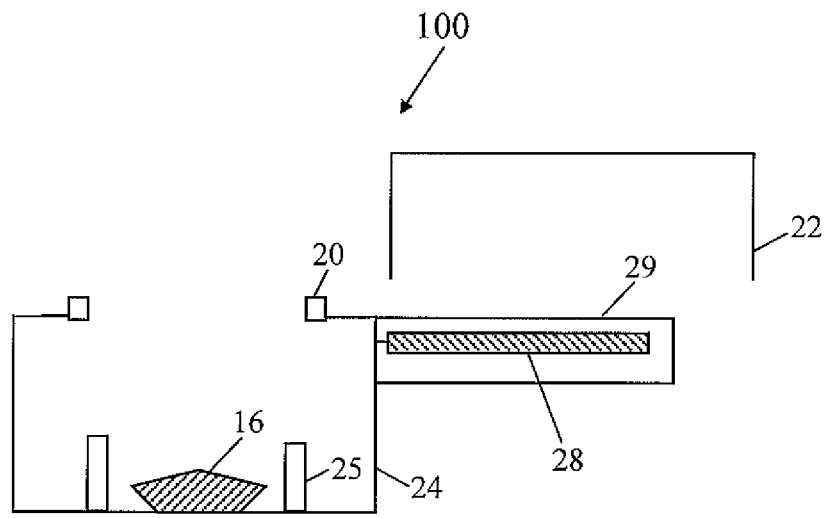
FIGS. 3 through 8 illustrate respective manufacturing process steps to make a vacuum formed product using the vacuum forming machine 100.

The controller 40 controls the opening and closing operations of the first and second valves 27a and 27b by reference to the pressure information collected by the pressure information collector and the temperature information collected by the temperature information collector while the pressure reducer 26 is operating, i.e., based on a result of sensing done by the pressure sensors 31a and 31b and the temperature sensor 32. FIG. 2 is a block diagram schematically illustrating the arrangement of the controller 40, the pressure sensors 31a and 31b, the atmospheric pressure sensor 33, the temperature sensor 32 and the first and second valves 27a and 27b.

As shown in FIG. 2, the first and second pressure sensors 31a and 31b, the atmospheric pressure sensor 33 and the temperature sensor 32 sense the pressure inside the upper box 22, the pressure inside the lower box 24, the atmospheric pressure, and the temperature of the sheet 10, respectively, and output signals representing their sensing results. The controller 40 receives those sensing signals from the first and second pressure sensors 31a and 31b, the atmospheric sensor 33 and the temperature sensor 32 and changes the degrees of opening of the first and second valves 27a and 27b according to the magnitudes of the pressures and temperature represented by those signals. The controller 40 may be implemented as a microcomputer, for example.

As described above, the vacuum forming machine 100 of this preferred embodiment preferably includes a plurality of pressure sensors 31a and 31b and a temperature sensor 32 and also includes a controller 40 programmed to control the opening and closing operations of the first and second valves 27a and 27b based on results of sensing done by those pressure sensors 31a and 31b and temperature sensor 32 while the pressure reducer 26 is operating. That is why the opening and closing operations of the first and second valves 27a and 27b can be controlled according to the actual pressures inside the upper and lower boxes 22 and 24 and the temperature of the sheet 10, and the pressures inside the upper and lower boxes 22 and 24 can be adjusted independently of each other. As a result, it is possible to prevent sagging of the sheet 10 from ruining the appearance of a final vacuum formed product as will be described later.

In addition, since the vacuum forming machine 100 of this preferred embodiment can adjust the pressures inside the upper and lower boxes 22 and 24 independently of each other, the upper and lower boxes 22 and 24 may have mutually different volumes. In other words, there is no need to make the volumes of the upper and lower boxes 22 and 24 equal to each other. Consequently, the overall size of the vacuum forming machine 100 can be reduced. On top of that, as there is no need to provide two pressure reducers separately for the upper and lower boxes 22 and 24, respectively (i.e., only one vacuum pump may be used as the pressure reducer 26), the size can be further reduced.

Typically, the controller 40 can perform a control operation that sets the pressure inside the lower box 24 to be higher than the pressure inside the upper box 22 (such a control operation will be referred to herein as a "first type of control"). By setting the pressure inside the lower box 24 to be higher than the one inside the upper box 22, the sheet 10 that has softened under the heat can be held almost horizontally, thus minimizing sagging of the sheet 10.

That first type of control is started after at least one (and preferably both) of the pressures inside the upper and lower boxes 22 and 24 has been reduced to less than a predefined pressure $P_1$ and when or before the temperature of the sheet 10 reaches a preset temperature $T_1$ (which will be referred to herein as a "first preset temperature"). By starting the first type of control after the pressure(s) inside the upper and/or lower box(es) 22, 24 have/has been reduced sufficiently, the pressure difference between the upper and lower boxes 22 and 24 can be defined appropriately. However, if the first type of control was started before the pressures inside the upper and lower boxes 22 and 24 have been reduced sufficiently, then it could be difficult to produce a subtle pressure difference by varying the degrees of opening of the first and second valves 27a and 27b. Also, the first type of control is preferably continued until the temperature of the sheet 10 reaches another preset temperature $T_2$ that is higher than the first preset temperature $T_1$ (the former temperature will be referred to herein as a "second preset temperature").

The controller 40 may perform the first type of control by increasing the degree of opening of the first valve 27a compared to its degree of opening before the first type of control is started. Alternatively, the controller 40 may also perform the first type of control by decreasing the degree of opening of the second valve 27b compared to its degree of opening before the first type of control is started. Alternatively, the controller 40 may even perform the first type of control by increasing the degree of opening of the first valve 27a and decreasing the degree of opening of the second valve 27b compared to their respective degrees of opening before the first type of control is started.

The first temperature $T_1$ is preferably somewhat lower than the best temperature for performing a vacuum forming process. Specifically, the first temperature $T_1$ may fall within the range of approximately 20° C. through (Tg+20) ° C., where Tg ° C. is the glass transition temperature of the sheet base member 2 as measured by differential thermal analysis (DTA). Alternatively, the first temperature $T_1$ may also be such a temperature that makes the storage modulus E' of the sheet base member 2, which is estimated by dynamic viscoelasticity measurement as defined by ISO 6721, fall within the range of about 10 kPa through about 100 MPa, for example.

On the other hand, the second temperature $T_2$ is the best temperature for performing a vacuum forming process and may fall within the range of approximately (Tg+25) ° C. to (Tg+70) ° C. By continuing the first type of control until the temperature of the sheet 10 reaches the second temperature $T_2$ that is the best temperature for performing a vacuum forming process, it is possible to avoid more reliably such an unwanted situation where the appearance of a final formed product is ruined.

The predefined pressure $P_1$ is such a pressure that makes it easier to set an appropriate pressure difference between the upper and lower boxes 22 and 24 and may fall within the range of about 0.05 kPa to about 0.3 kPa as will be described later, and preferably about −90 kPa or less, for example. The reasons are as follows. Specifically, if the pressure $P_1$ were greater than about −90 kPa, the pressure difference could be too big to avoid deforming the sheet 10. On the other hand, if the pressure $P_1$ were less than about −99 kPa, then it might take too much time to get the pressure reduction done. That is why, in order to shorten the manufacturing process time, the pressure $P_1$ is preferably about −99 kPa or more, for example. Naturally, if the constraint on time is not so tight, then the pressure $P_1$ could be less than about −99 kPa. Also, the pressure $P_1$ does not always have to be a pressure right when the pressure reduction is done but may also be a pressure at some point in time before the pressure reduction is done.

It is preferred that the controller 40 perform the first type of control so that the pressure inside the lower box 24 becomes higher than the one inside the upper box 22 by no less than about 0.05 kPa and no more than about 0.3 kPa. The reason is as follows. Specifically, if the pressure difference between the lower and upper boxes 24 and 22 were less than about 0.05 kPa, sagging of the sheet 10 could not be reduced sufficiently. However, if the pressure difference were greater than about 0.3 kPa, then the sheet 10 would swell too much to avoid ruining its appearance.

The controller 40 preferably performs control so as to minimize the pressure difference between the upper and lower boxes 22 and 24 (i.e., reduce their difference to a predetermined value or less) since the pressures have started to be reduced by the pressure reducer 26 and until the first type of control is started. Such a control will be referred to herein as a "second type of control". Specifically, the controller 40 preferably performs the second type of control so that the pressure difference between the upper and lower boxes 22 and 24 becomes equal to or smaller than about 3 kPa, for example. By setting the pressure difference to be about 3 kPa or less, pulsation due to the pressure difference can be reduced sufficiently.

Furthermore, after completing the first type of control (i.e., when the temperature of the sheet 10 gets equal to or higher than the second preset temperature $T_2$), the controller 40 preferably performs a control that makes the pressure inside the upper box 22 higher than the pressure inside the lower box 24. Such a control will be referred to herein as a "third type of control". By setting the pressure inside the upper box 22 to be higher than the pressure inside the lower box 24, the sheet 10 can be pressed even more strongly against the base member 16.

The first and second valves 27a and 27b are preferably a type of valves that are opened and closed with a motor (i.e., motor valves). A motor valve includes a valve body and a motor that turns the valve body. Such a valve can have its degree of valve opening changed by getting the angle of the valve body adjusted by the motor. If the first and second valves 27a and 27b are motor valves, the pressures inside the upper and lower boxes 22 and 24 can be easily adjusted accurately enough. Naturally, the first and second valves 27a and 27b do not have to be motor valves but may also be any other type of valves as long as an arbitrary degree of valve opening is realized. For example, solenoid valves, hydraulic valves or pneumatic valves could also be used. It should be noted that a conventional vacuum forming machine does not perform a pressure control based on a result of sensing done by pressure sensors or temperature sensors and therefore uses an ON/OFF valve that cannot have a medium degree of opening.

In the preferred embodiment described above, a plurality of pressure sensors 31a and 31b inside the upper and lower boxes 22 and 24 are preferably used as a pressure information collector. However, this is just an example and any other kind of pressure information collector may also be used as long as it can collect information about the pressures inside the upper and lower boxes 22 and 24. That is to say, it not always necessary to directly sense the pressures inside the upper and lower boxes 22 and 24. Optionally, pressure sensors could be provided for a channel between the upper box 22 and the first valve 27a and a channel between the lower box 24 and the second valve 27b. The values of pressures sensed by those pressure sensors arranged at such positions are approximately equal to those of pressures inside the upper and lower boxes 22 and 24. That is why those pressure sensors can also work as a pressure information collector effectively.

Also, in the preferred embodiment described above, a temperature sensor 32 arranged to sense the temperature of the sheet 10 is preferably used as a temperature information collector. However, this is just an example and any other kind of temperature information collector may also be used as long as it can collect information about the temperature of the sheet 10. That is to say, it not always necessary to sense the temperature of the sheet 10 directly. For example, temperature sensors arranged to measure the temperatures of spaces inside the upper and lower boxes 22 and 24 (e.g., contact temperature sensors such as thermocouples) may be provided and the temperature of the sheet 10 may be estimated based on the temperatures measured by those temperature sensors. Alternatively, the temperature of the sheet 10 may also be estimated by the amount of time that has passed since heating was started. In other words, the amount of time that has passed since the start of heating could be used as temperature information. In that case, the temperature information collector may be a timer for keeping the amount of time that has passed since the start of heating. If a microcomputer is used as the controller 40, that timer could be built in the microcomputer.

What is more, the pressure information collector does not have to be provided at all. That is to say, with the pressure information collector omitted, the controller 40 could control the opening and closing operations of the first and second valves 27a and 27b by reference to only the temperature information that has been collected by the temperature information collector. If the control is performed based on temperature information at least, the pressures inside the upper and lower boxes 22 and 24 can be controlled independently of each other, thus making it possible to avoid an unwanted situation where the appearance is ruined. To more reliably prevent the appearance from being marred, it is still preferred that the controller 40 control the opening and closing operations of the first and second valves 27a and 27b by reference to not just the temperature information but also to pressure information as well, as is done in this preferred embodiment.

Next, it will be described how to make a vacuum formed product using the vacuum forming machine 100 described above. The manufacturing process of this preferred embodiment includes at least the step of preparing the decorative sheet 10 and the step of attaching the decorative sheet 10 onto the base member 16. Hereinafter, the manufacturing process will be described in detail with reference to FIGS. 3 through 8, which are cross-sectional views illustrating respective process steps to make a vacuum formed product. It should be noted that in FIGS. 3 to 8, some members of the vacuum forming machine 100 are not illustrated.

First of all, a base member 16 is prepared and arranged inside the lower box 24. The base member 16 may be made of a resin material as described above but may also be made of a metallic material or any other suitable material. The base member 16 can be made by any known process. For example, the base member 16 may be made of a resin material by injection molding process. As the resin material, an ABS resin or an AES resin is generally preferred but nylon is preferably used in view of its thermal resistance. Also, taking the environmental issues into consideration, an olefin-based recycled material or polyethylene is preferably used.

Figure 4:
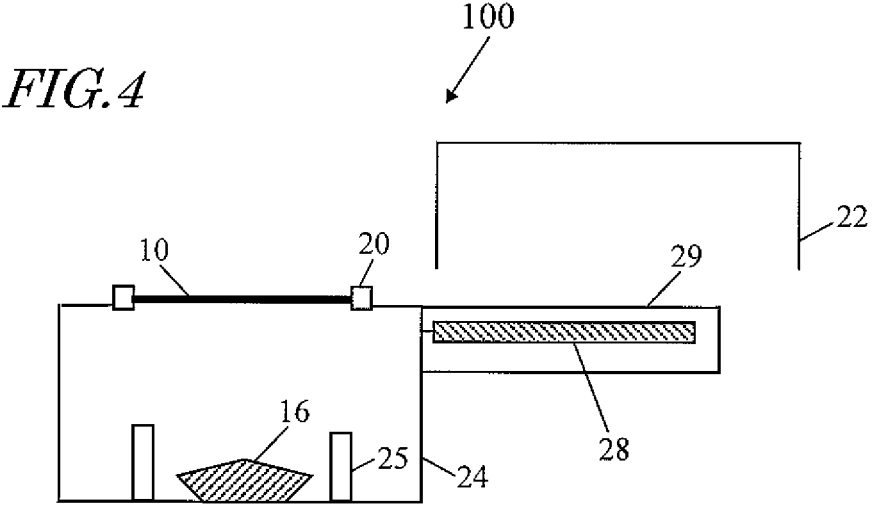

Next, as shown in FIG. 4, a decorative sheet 10 is prepared (this process step will be referred to herein as a "sheet preparing step") and fixed onto the holder 20. As described above, the sheet 10 includes a decoration layer 1 and a sheet base member (supporting layer) 2 that supports the decoration layer 1. The decoration layer 1 may be either an ink layer formed by printing or a metal layer formed by depositing a metallic material, for example. The decoration layer 1 does not have to be a single layer but may also have a multilayer structure in which an ink layer, a metal layer, and other layers have been stacked one upon the other. The sheet base member 2 is made of a resin material such as polycarbonate or polyethylene terephthalate. An adhesive has been applied onto one of the two surfaces of the sheet 10.

Figure 5:
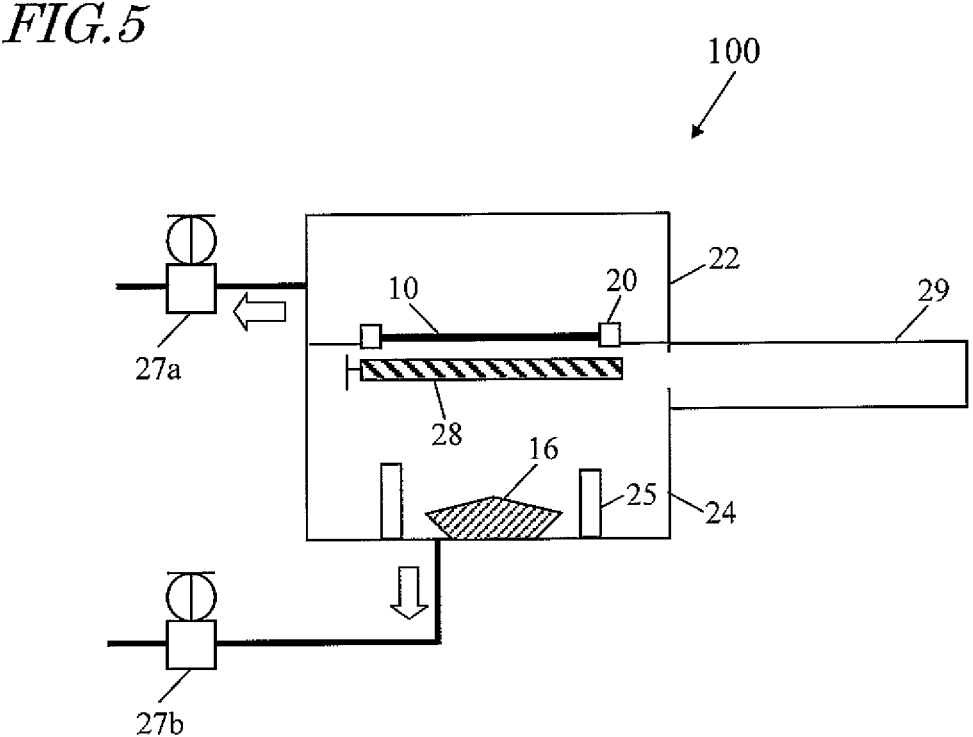

Subsequently, the sheet 10 is attached onto the base member while being formed. This process step will be referred to herein as an "attaching step". Specifically, first, pressures inside the lower and upper boxes 24 and 22 are reduced as shown in FIG. 5. That is to say, the pressure in a first space between the sheet 10 and the base member 16 (which will be referred to herein as a "lower space") and the pressure in a second space that spreads over the sheet 10 opposite to the lower space (which will be referred to herein as an "upper space") are reduced. This process step will be referred to herein as a "pressure reducing step". Also, in the meantime, the sheet 10 is heated with the heater 28. This process step will be referred to herein as a "heating step".

Figure 6:
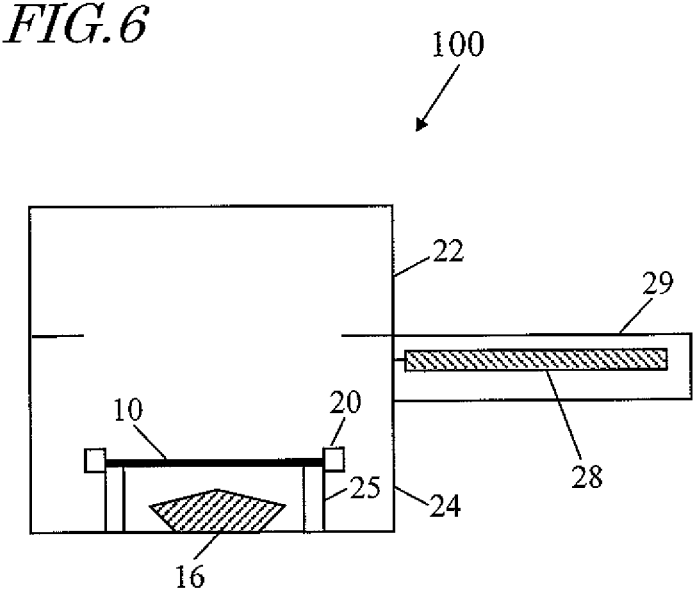
Figure 7:
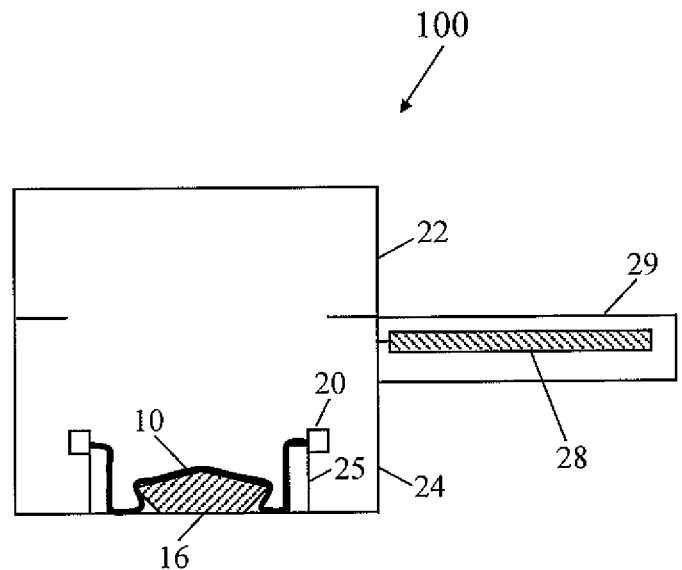

Next, the sheet 10 is lowered toward the frame 25 until the sheet 10 contacts with the frame 25 as shown in FIG. 6, and then bonded onto the base member 16 as shown in FIG. 7. During this bonding process step, the sheet 10 is attached while being stretched so as to trace the surface shape of the base member 16.

Figure 8:
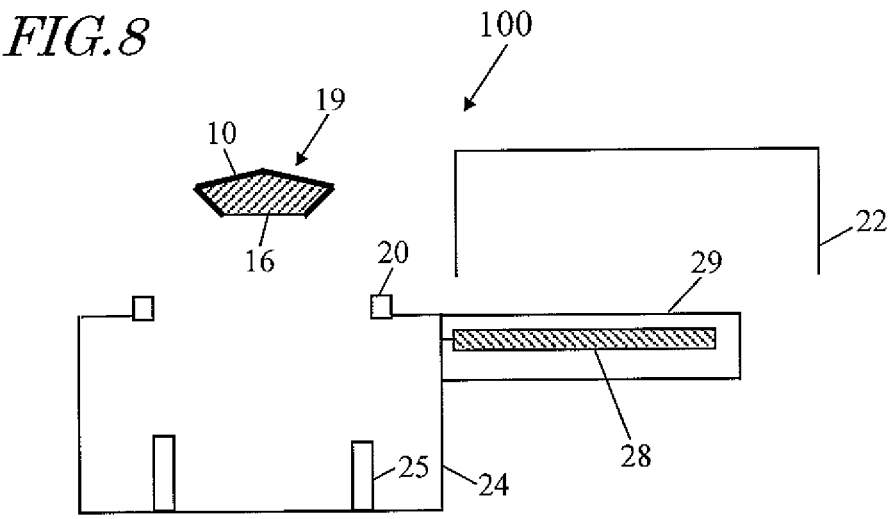

After that, excessive portions of the sheet 10 (i.e., portions that do not cover the base member 16 but extend over the member 16) are cut off (or trimmed) with some cutter such as a rotary blade, thereby completing a vacuum formed product 19 including the base member 16 and the decorative sheet 10 that has been attached onto the surface of the base member 16 as shown in FIG. 8.

According to the manufacturing process of this preferred embodiment, the temperature of the sheet 10 is sensed by the temperature sensor 32 and the pressures are sensed by the first and second pressure sensors 31a and 31b in the process steps shown in FIGS. 5 to 7. That is to say, the attaching step includes not only the heating step and the pressure reducing step but also a temperature information collecting step for collecting temperature information about the temperature of the sheet 10 and a pressure information collecting step for collecting pressure information about the pressures inside the lower and upper spaces.

Also, the pressure reducing step of this preferred embodiment is performed by reference to the temperature information that has been collected in the temperature information collecting step and the pressure information that has been collected in the pressure information collecting step so as to adjust the degrees of pressure reduction in the lower and upper spaces independently of each other. Thus, it is possible to avoid an unwanted situation where the appearance of a final vacuum formed product is ruined due to sagging of the sheet 10.

Also, the pressure reducing step typically includes the step of adjusting the degrees of pressure reduction in the lower and upper spaces so that the pressure in the lower space becomes higher than the pressure in the upper space. Such a process step (which will be referred to herein as a "first adjusting step") corresponds to a period of time in which the controller 40 is performing the "first type of control" described above. By setting the pressure in the lower space to be higher than the one in the upper space, the sheet 10 that has softened under the heat can be held almost horizontally, thus minimizing sagging of the sheet 10. This first adjusting step is preferably started after at least one of the pressures in the lower and upper spaces has been reduced to less than a predefined pressure $P_1$ and when or before the temperature of the sheet 10 reaches a first preset temperature $T_1$, and is preferably continued until the temperature of the sheet 10 reaches a second preset temperature $T_2$. By starting the first adjusting step after the pressure(s) in the lower and/or upper space(s) have/has been reduced sufficiently, the pressure difference between the lower and upper spaces can be defined appropriately.

The pressure reducing step preferably includes the step of adjusting the degrees of pressure reduction in the lower and upper spaces so that a pressure difference between the lower and upper spaces is minimized (i.e., becomes equal to or smaller than a predetermined value) since the pressure reducing step has been started and until the first adjusting step is started. Such a process step (which will be referred to herein as a "second adjusting step") corresponds to a period of time in which the controller 40 is performing the "second type of control" described above.

Figure 9:
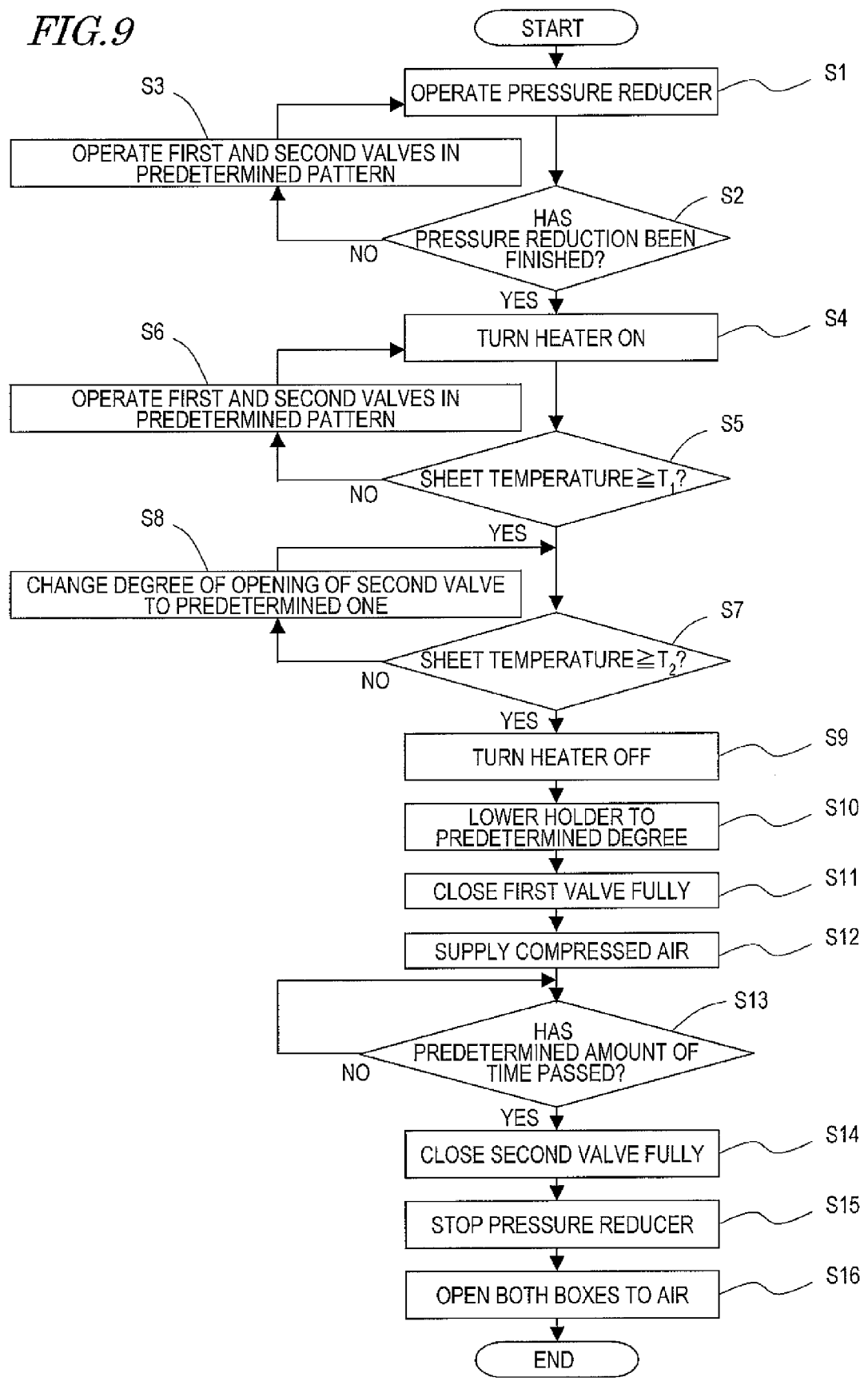
FIG. 9 is a flowchart showing the details of an attaching step in the process of making a vacuum formed product using the vacuum forming machine 100.
Figure 10:
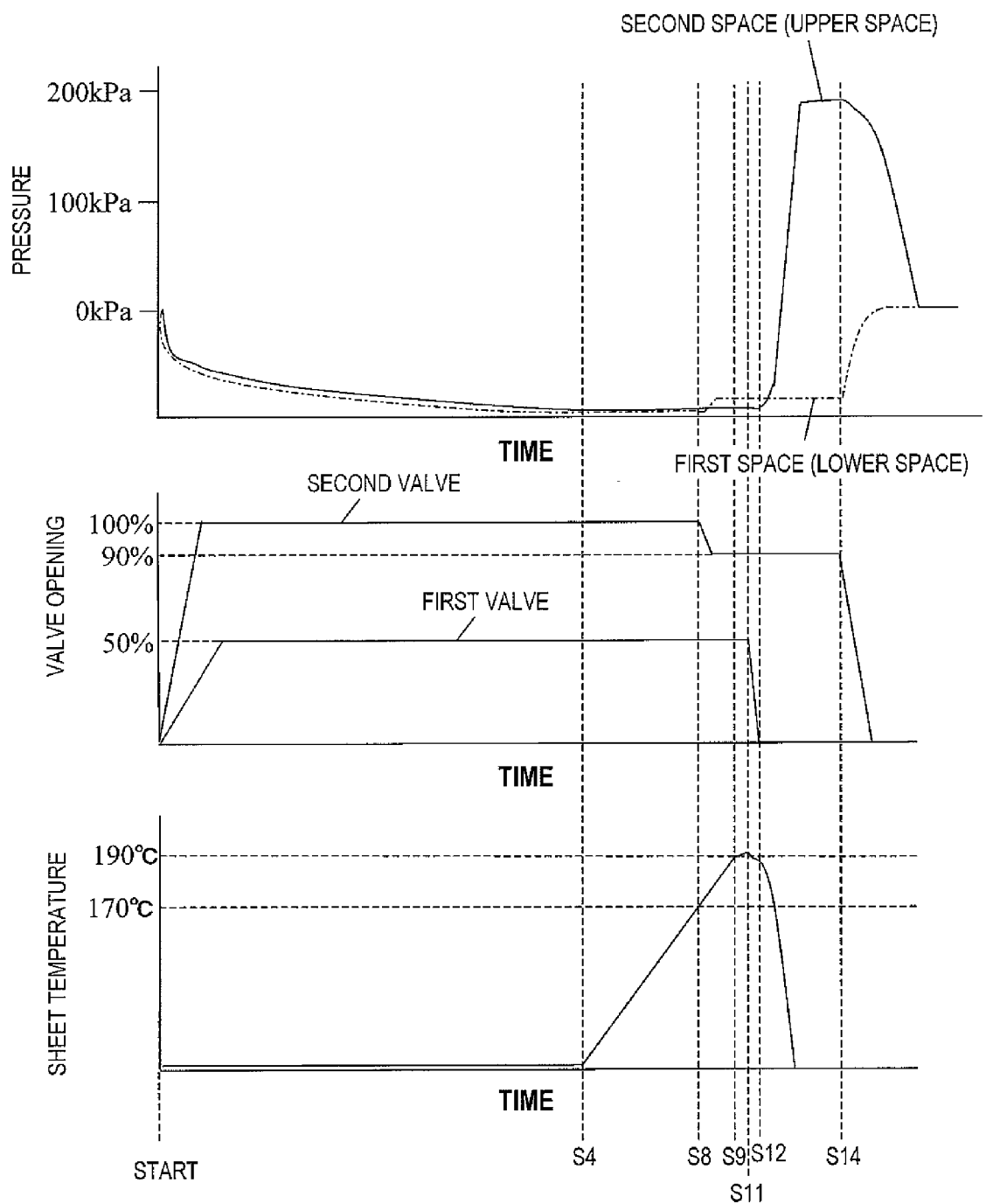
FIG. 10 is an exemplary timing diagram that can be used in the attaching step shown in FIG. 9.

FIG. 9 illustrates a flowchart showing the detailed process steps of the attaching step, and FIG. 10 illustrates a timing diagram representing the procedure of the attaching step. Specifically, the timing diagram shown in FIG. 10 shows how the pressures in the lower and upper spaces (i.e., first and second spaces), the degrees of opening of the first and second valves 27a and 27b, and the temperature of the sheet 10 change with time. FIG. 10 illustrates an example in which the sheet base member 2 of the sheet 10 is made of polycarbonate and has a glass transition temperature Tg of about 150° C. Also, the pressures in the lower and upper spaces shown in FIG. 10 are differential pressures with respect to the atmospheric pressure (i.e., gauge pressures). That is to say, a pressure lower than the atmospheric pressure is represented by a negative value.

The attaching step starts by turning the switch of the vacuum forming machine 100 ON. As a start, first of all, the pressure reducer 26 (which is typically a vacuum pump) is operated in Step S1.

Next, it is determined, based on the sensing results obtained by the pressure sensors 31a and 31b, whether or not the pressure reduction (or evacuation) is done (in Step S2). If the values of the pressures sensed by the pressure sensors 31a and 31b are both equal to or smaller than a predetermined value of about −95 kPa, for example, then it is determined that the pressure reduction is done. It should be noted that the pressure value to make the decision on (i.e., the predefined pressure $P_1$ described above) does not have to be about −95 kPa for use in this example but could be either greater or smaller than that value. Also, even if "pressure reduction is done", it does not mean that the pressure reducing step has been finished. This is because the pressure reducing step refers to not only the period in which the pressure is reduced significantly (i.e., a pressure reduced state is created) right after the pressure reducer 26 has been turned ON but also a period in which a high degree of vacuum (i.e., the pressure reduced state) is maintained after that.

Until the pressure reduction is done, the first and second valves 27a and 27b are repeatedly operated in a predetermined pattern that is stored in the controller 40 (in Step S3). Specifically, the first and second valves 27a and 27b are controlled to open at a predetermined rate to, and then maintain, their target degrees of opening. The rate of opening the first and second valves 27a and 27b and their target degrees of opening are determined in advance so that the pressure difference between the upper and lower boxes 22 and 24 becomes equal to or smaller than 3 kPa.

Until the pressure reduction is done, the process step S3 is carried out repeatedly. By performing this process step S3 a number of times, the first and second valves 27a and 27b are going to increase their degrees of opening as indicated by the middle graph in FIG. 10. In this example, as the target degrees of opening of the first and second valves 27a and 27b are set to be 50% and 100%, respectively, the degrees of opening of the first and second valves 27a and 27b increase from 0% to 50% and from 0% to 100%, respectively. As a result, the pressures in the lower and upper spaces decrease to approximately −90 kPa to −100 kPa as indicated by the upper graph in FIG. 10.

The first and second valves 27a and 27b have such significantly different target degrees of opening (e.g., about 50% and about 100%, respectively) because the upper and lower boxes 22 and 24 have quite different volumes in this example. It should be noted, however, that the target degrees of opening of the first and second valves 27a and 27b at the start of pressure reduction do not have to be the values shown in FIG. 10 but could be almost equal to each other according to the volumes of the upper and lower boxes 22 and 24. Also, when the process step S3 is carried out for the second time and on, the rate of opening the first and second valves 27a and 27b and their target degrees of opening could be adjusted based on the sensing results obtained by the pressure sensors 31a and 31b.

When the pressure reduction is done, the heater 28 is turned ON, thereby starting to heat the sheet 10 with the heater 28 (in Step S4). As a result, the temperature of the sheet 10 begins to rise as indicated by the lower graph shown in FIG. 10.

Thereafter, it is determined, based on the sensing result obtained by the temperature sensor 32, whether or not the temperature of the sheet 10 is equal to or higher than the first preset temperature $T_1$ (in Step S5). In this example, the first preset temperature $T_1$ is about 170° C., which is higher by about 20° C. than the glass transition temperature Tg of the sheet base member 2.

Until the temperature of the sheet 10 reaches about 170° C., the first and second valves 27a and 27b are operated in Step S6 according to a predetermined pattern that is stored in the controller 40 as in the process step S3.

And when the temperature of the sheet 10 becomes equal to or higher than 170° C., it is determined, based on the sensing result obtained by the temperature sensor 32, whether or not the temperature of the sheet 10 is equal to or higher than the second preset temperature $T_2$ (in Step S7). In this example, the second preset temperature $T_2$ is about 190° C., which is higher by about 40° C. than the glass transition temperature Tg of the sheet base member 2.

But if the temperature of the sheet 10 is equal to or higher than about 170° C. but lower than about 190° C., the degree of opening of the second valve 27b is controlled in Step S8 to be a predetermined degree of opening that is smaller than the original target degree of opening (i.e., the target degree of opening in the process steps S3 and S6). That is to say, the target degree of opening of the second valve 27b is set to be narrower than the predefined one so that the pressure in the first space becomes higher than the one in the second space by a predetermined value. The target degree of opening for use in such a situation is also stored in the controller 40.

By performing this process step S8 repeatedly, the degree of opening of the second valve 27b starts to decrease when the temperature of the sheet 10 reaches about 170° C. In this example, as the target degree of opening of the second valve 27b in the process step S8 is set to be about 90% so that the pressure in the lower space becomes higher than the one in the upper space by about 0.05 kPa to about 0.3 kPa, the degree of opening of the second valve 27b decreases from about 100% to about 90%, for example. It should be noted that in FIG. 10, the pressure difference between the lower and upper spaces is magnified to more than about 0.3 kPa to let the reader see at a glance that the pressure in the lower space is higher than the pressure in the upper space.

And when the temperature of the sheet 10 becomes equal to or higher than about 190° C., the heater 28 is turned OFF to stop heating the sheet 10 with the heater 28 (in Step S9).

Thereafter, at an appropriate timing (e.g., when the temperature of the sheet becomes about 190° C.), the holder 20 is lowered to a predetermined level (in Step S10), thereby lowering the sheet 10 (i.e., performing the process step shown in FIG. 6).

When the sheet 10 is lowered to the predetermined level, the first valve 27a is fully closed (i.e., the target degree of opening of the first valve 27a is set to be 0%) and operated (in Step S11). And when the first valve 27a is fully closed, compressed air is supplied to the upper space using a compressor (not shown) in Step S12. As a result, the pressure in the upper space becomes higher than the one in the lower space. It should be noted that it is not always necessary to supply compressed air. Alternatively, the pressure in the upper space could be raised to the atmospheric pressure by establishing communication between the upper box 22 and the air outside of this machine.

After the pressure in the upper space has been increased to approximately 200 kPa, for example, the next process step needs to wait a predetermined amount of time to get the sheet attached just as intended. For that purpose, it is determined in Step S13 whether or not a predetermined amount of time (of two seconds, for example) has passed since the pressure was increased.

When the predetermined amount of time passes, the second valve 27b is closed fully (i.e., the target degree of opening of the second valve 27b is set to be 0%) in Step S14 and the pressure reducer 26 is stopped in Step S15.

Thereafter, the upper and lower boxes 22 and 24 are opened to the air (in Step S16). As a result, the pressures in the upper and lower spaces become equal to the atmospheric pressure and the attaching step ends.

In the example illustrated in FIGS. 9 and 10, when the temperature of the sheet 10 reaches the first preset temperature $T_1$ (e.g., about 170° C. in this example), the degree of opening of the second valve 27b starts to be decreased. However, the degree of opening of the second valve 27b does not have to start to be decreased at that timing. Alternatively, the degree of opening of the second valve 27b could also start to be decreased at an arbitrary point in time after the pressure(s) inside the upper and/or lower box(es) 22, 24 (i.e., in the lower and/or upper spaces) have/has decreased to a predefined value (of −95 kPa in this example) or less and before the temperature of the sheet 10 reaches the first preset temperature $T_1$. As for the timing diagram shown in FIG. 10, the degree of opening of the second valve 27b could start to be decreased at any point in time between S4 and S8. Naturally, it is also possible to start increasing the degree of opening of the first valve 27a instead of decreasing the degree of opening of the second valve 27b. Still alternatively, the degrees of opening of the second and first valves 27b and 27a could start to be decreased and increased, respectively, at the same time.

Figure 11:
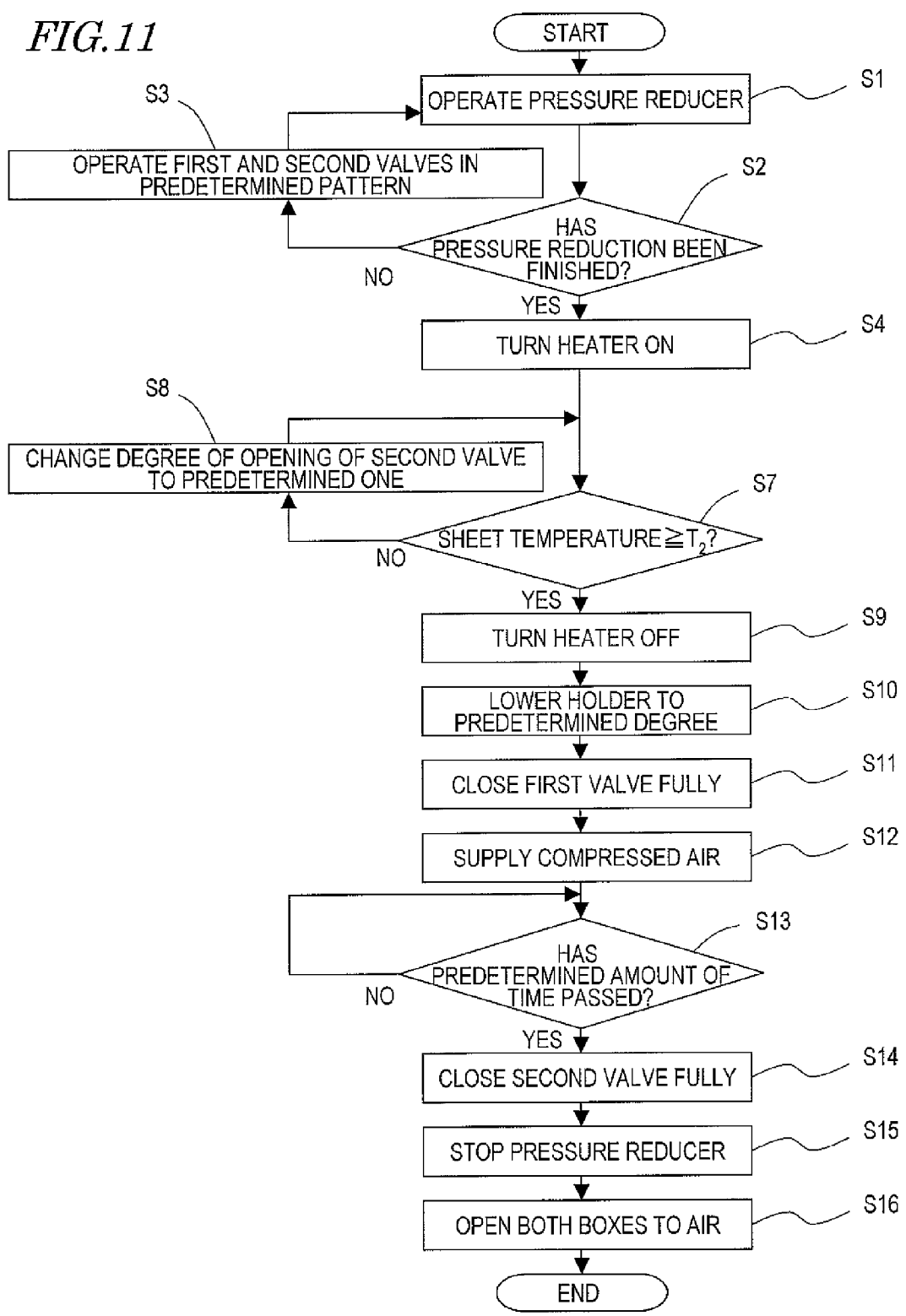
FIG. 11 is a flowchart showing the details of an alternative attaching step in the process of making a vacuum formed product using the vacuum forming machine 100.

For example, as shown in FIG. 11, the degree of opening of the second valve 27b could start to be decreased almost as soon as the heater 28 is turned ON in the process step S4. According to the flowchart shown in FIG. 11, after the sheet 10 has started to be heated with the heater 28 (in Step S4), it is determined, based on the sensing result obtained by the temperature sensor 32, whether or not the temperature of the sheet 10 is equal to or higher than the second preset temperature $T_2$ (in Step S7). If the temperature of the sheet 10 is equal to or higher than about 170° C. but lower than about 190° C., for example, the degree of opening of the second valve 27b is controlled in Step S8 to be a predetermined degree that is smaller than the original target degree defined in Step S3 so that the pressure in the lower space becomes higher than the one in the upper space. And when the temperature of the sheet 10 becomes equal to or higher than about 190° C., the heater 28 is turned OFF to stop heating the sheet 10 with the heater 28 (in Step S9). As can be seen, according to the flowchart shown in FIG. 11, the process steps S5 and S6 shown in FIG. 9 can be omitted.

Figure 12:
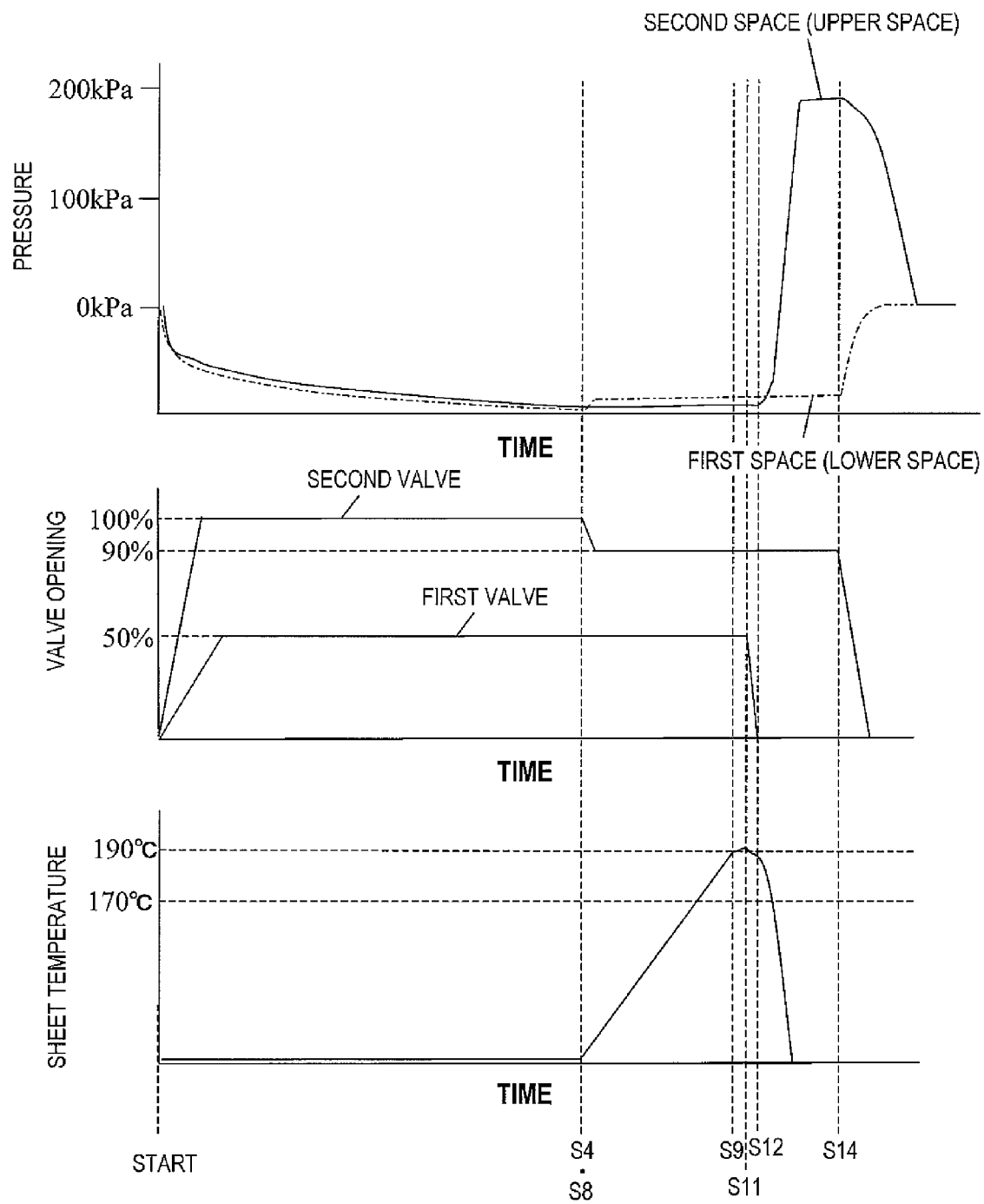
FIG. 12 is an exemplary timing diagram that can be used in the attaching step shown in FIG. 11.

FIG. 12 illustrates an exemplary timing diagram corresponding to the flowchart shown in FIG. 11. According to the timing diagram shown in FIG. 10, when the temperature of the sheet 10 reaches about 170° C., the degree of opening of the second valve 27b starts to decrease. On the other hand, according to the timing diagram shown in FIG. 12, the degree of opening of the second valve 27b starts to decrease almost as soon as the temperature of the sheet 10 starts to rise. Consequently, no sooner has the temperature of the sheet 10 started to increase than the pressure in the first space also starts to rise.

Figure 13:
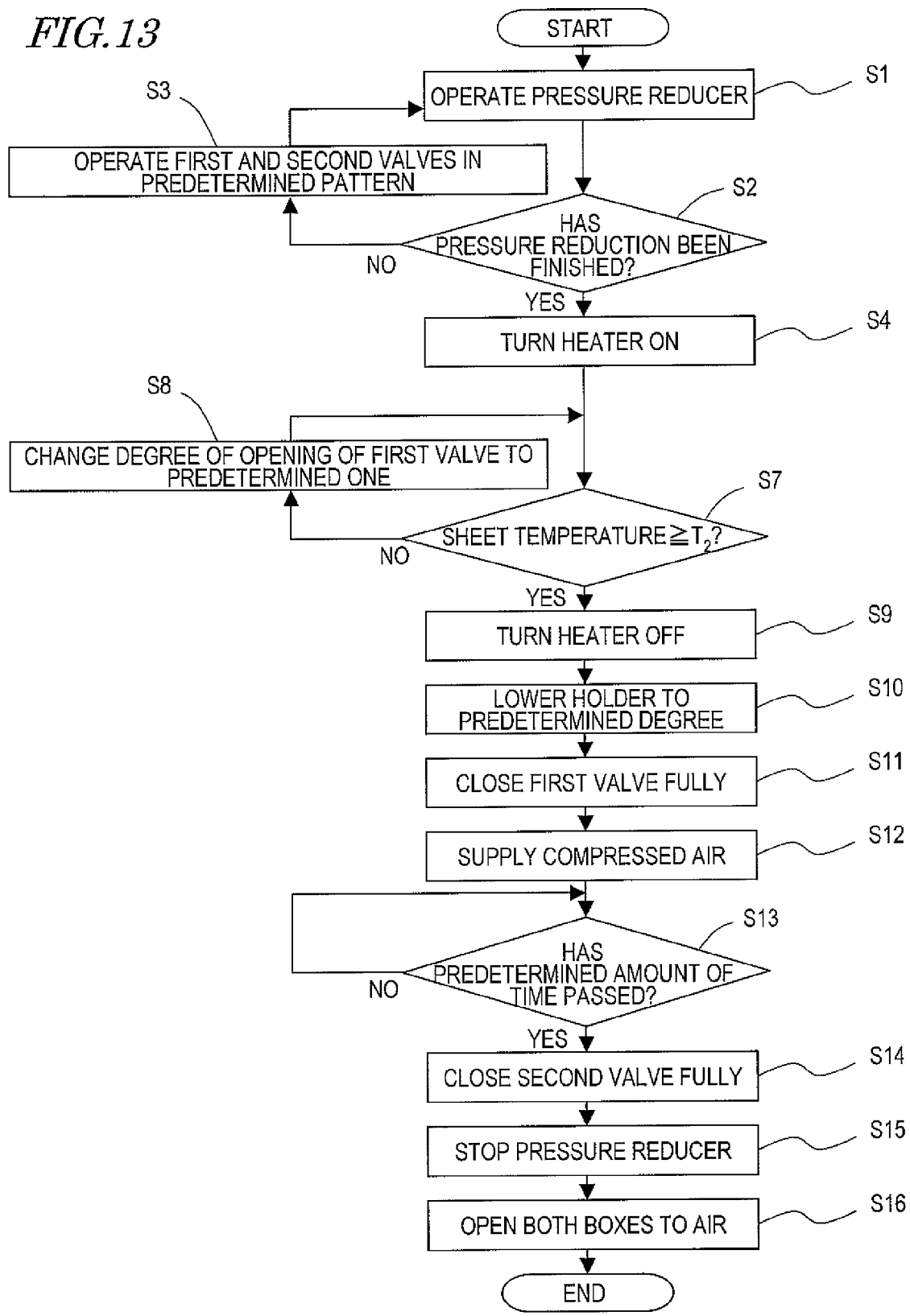
FIG. 13 is a flowchart showing the details of another alternative attaching step in the process of making a vacuum formed product using the vacuum forming machine 100.
Figure 14:
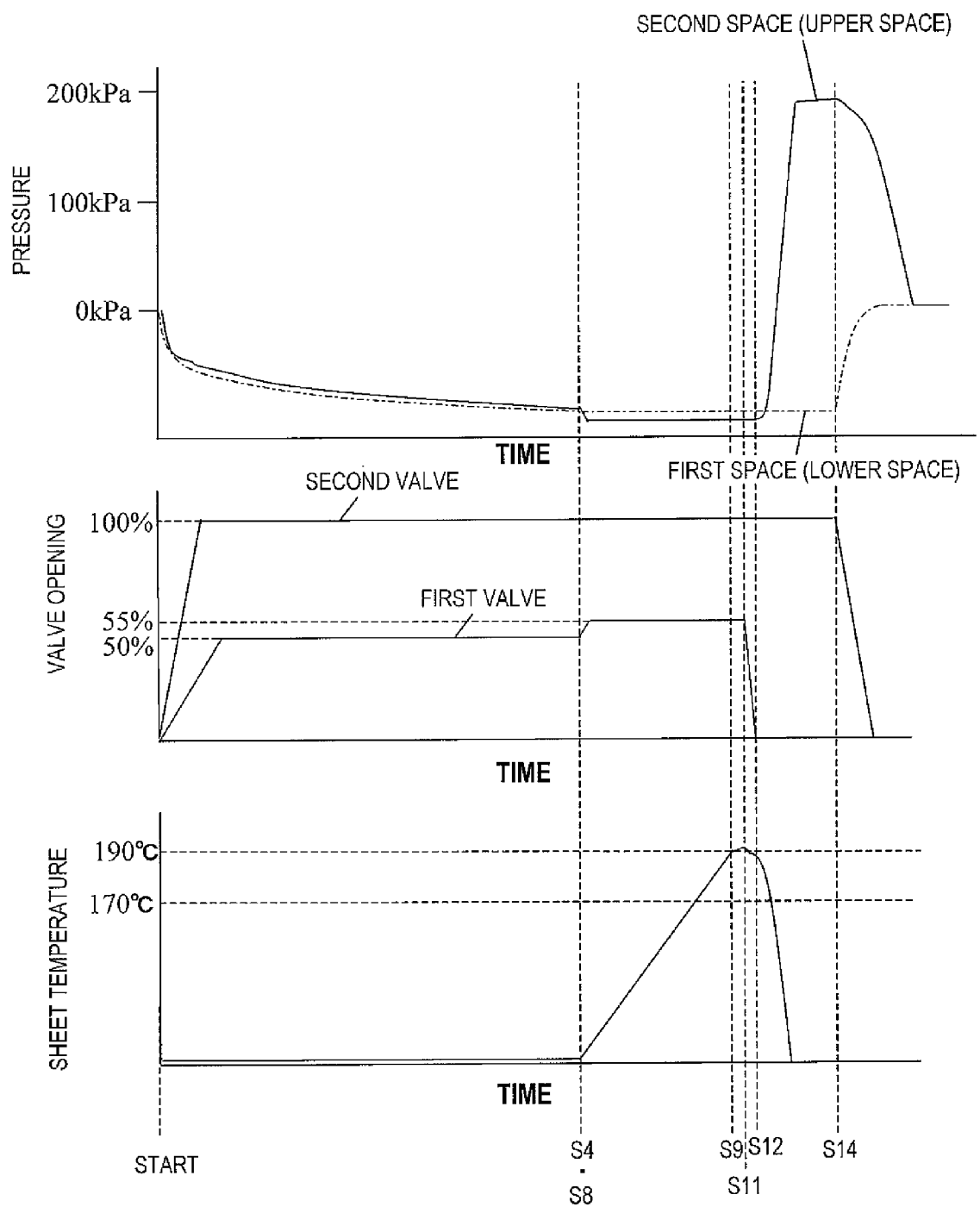
FIG. 14 is an exemplary timing diagram that can be used in the attaching step shown in FIG. 13.

Alternatively, instead of decreasing the degree of opening of the second valve 27b, the degree of opening of the first valve 27a could be increased as shown in FIGS. 13 and 14. In the example illustrated in FIGS. 13 and 14, in Step S8, the degree of opening of the first valve 27a is controlled to be a predetermined degree that is greater than the original target degree (as defined in Step S3) so that the pressure in the lower space becomes higher than the one in the upper space.

As described above, according to a preferred embodiment of the present invention, it is possible to prevent a vacuum formed product, which is being manufactured by vacuum forming process using the decorative sheet 10, from having its appearance ruined. Preferred embodiments of the present invention are applicable to a vacuum forming process that uses any of various kinds of decorative sheets 10. Among other things, preferred embodiments of the present invention can be used particularly effectively when the decorative sheet 10 needs to be formed at a relatively high temperature and within a narrow temperature range.

Figure 15:
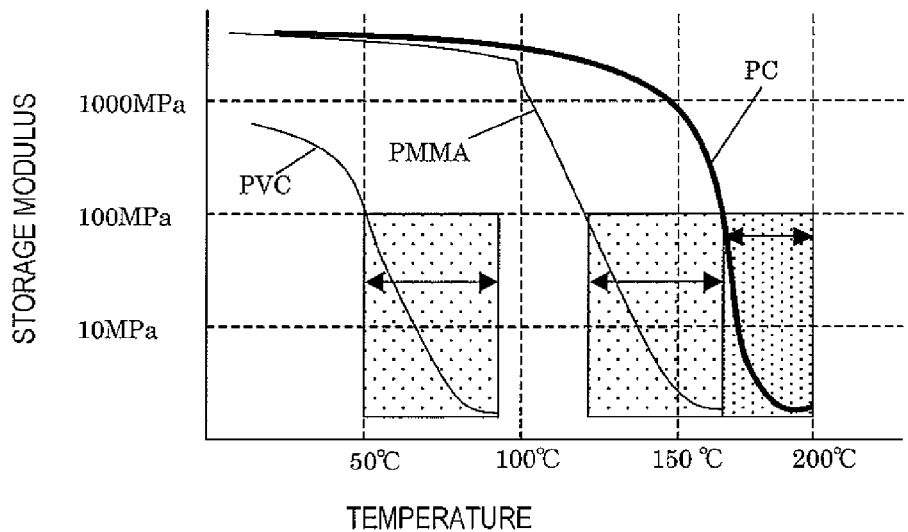
FIG. 15 shows the temperature dependence of the storage moduli E' that were obtained by measuring the dynamic viscoelasticity of polyvinyl chloride, polymethyl methacrylate and polycarbonate.

The preferred temperature range for forming the decorative sheet 10 varies according to the resin material of the sheet base member 2. FIG. 15 shows the temperature dependence of the storage moduli E' (corresponding to the moduli of elasticity) that were obtained by measuring the dynamic viscoelasticity of polyvinyl chloride (PVC), polymethylmethacrylate (PMMA) and polycarbonate (PC).

The decorative sheet 10 is preferably formed at such a temperature at which the sheet base member 2 has a storage modulus E' of about 100 MPa or less, for example. That is to say, according to the curves representing the moduli of elasticity shown in FIG. 15, the broader the temperature range in which the storage modulus is about 100 MPa or less (which will be referred to herein as a "formable range"), i.e., the less steep its gradient, and the closer to lower temperatures the temperature range, the more easily the forming process should be done. As can be seen from FIG. 15, the formable range of PVC is from about 50° C. through about 90° C. but those of PMMA and PC are from about 120° C. through about 170° C. and from about 170° C. through about 200° C., respectively. These results reveal that if the sheet base member 2 is made of PMMA, the vacuum forming process is more difficult to be done than a situation where the sheet base member 2 is made of PVC. Also, if the sheet base member 2 is made of PC, the vacuum forming process is even more difficult to get done. That is to say, preferred embodiments of the present invention will be especially advantageous if the sheet base member 2 is made of a material, of which the formable range has a relatively high lower limit (more specifically, if the sheet base member 2 is made of a material of which the formable range has a lower limit of about 150° C. or more (e.g., PC).

The conventional vacuum forming machine does not finely control the pressures inside the upper and lower boxes based on the sensing results obtained by pressure and temperature sensors. This is because the conventional vacuum forming machine supposes the sheet base member 2 to be made of easily formable PVC. However, the temperature of the sheet 10 should fall within the formable range in the interval between the end of heating and the end of attaching. That is why the sheet 10 is generally heated to a temperature that is higher than the lower limit of the formable range by about 20° C., for example. Nevertheless, if a material that has as narrow a formable range as PC's were used, then the sheet 10 would become too soft for a conventional vacuum forming machine to avoid ruining the appearance of a final vacuum formed product. On the other hand, according to a preferred embodiment of the present invention, even if the sheet base member 2 is made of PC that is rather difficult to form, the vacuum forming process can be performed just as intended.

Optionally, as a different approach from that of the present invention, sagging of the sheet could be directly sensed with an optical sensor, for example, and the pressures inside the boxes could be adjusted based on its sensing result. However, if a material that has as narrow a formable range as PC's were used, the sheet 10 would be too soft to avoid sagging quickly and excessively even by changing the pressures after that sagging has been detected. According to a preferred embodiment of the present invention, on the other hand, even if such a sheet 10 that would easily soften too much under the heat is used, it is still possible to prevent the sheet 10 from sagging.

Figure 16:
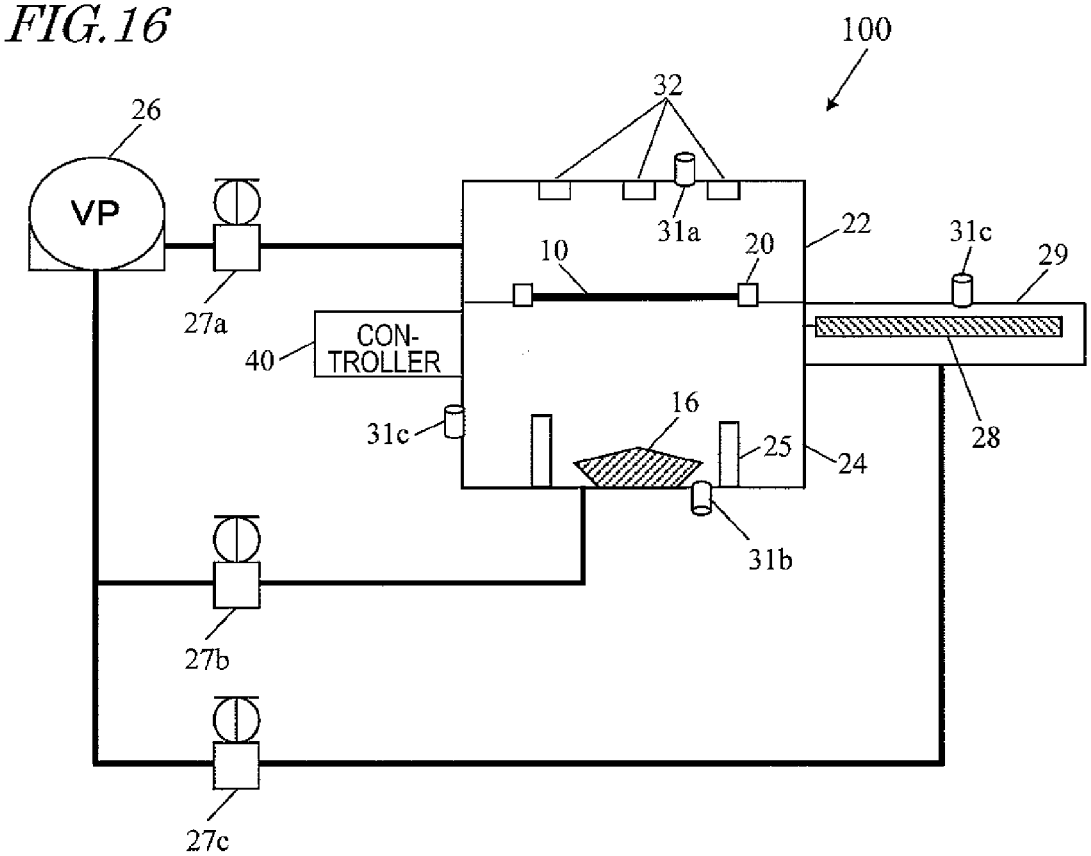
FIG. 16 schematically illustrates a vacuum forming machine 100 according to another preferred embodiment of the present invention.

In the preferred embodiment described above, the vacuum forming machine preferably includes a heater box 29. However, the heater box 29 does not have to be provided. Alternatively, the heater 28 may be arranged inside the upper box 22 and the heater box 23 may be omitted. On the other hand, in the arrangement with the heater box 29, a third pressure sensor 31c arranged to sense the pressure inside the heater box 29 and a third valve 27c arranged to adjust the degree of pressure reduction inside the heater box 29 could be provided additionally as shown in FIG. 16.

Also, in the preferred embodiment described above, the sheet 10 is preferably lowered along with the holder 20 in the forming process step. Conversely, the base member 16 may be raised. In that case, a table (or a supporting stage) that supports the base member 16 may be arranged inside the lower box 24 and may be raised along with that table.

A vacuum formed product 19 made by the manufacturing process of this preferred embodiment has a fine appearance and can be used effectively as an exterior member for various types of transportation vehicles. The formed product can be used effectively as the tank housing, front fender or tail cowl of a motorcycle, for example.

According to a preferred embodiment of the present invention, it is possible to prevent the appearance of a vacuum formed product, obtained by performing a vacuum forming process using a decorative sheet, from being ruined and also to prevent the decorative sheet from being attached imperfectly.

A vacuum formed product obtained with the vacuum forming machine according to a preferred embodiment of the present invention or by the method of making a vacuum formed product according to a preferred embodiment of the present invention has such a fine appearance as to be used effectively as an exterior member for various types of transportation vehicles including passenger cars, buses, trucks, motorcycles, tractors, airplanes, motorboats, and civil engineering vehicles.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2008-333754 filed on Dec. 26, 2008, the entire contents of which are hereby incorporated by reference.

What is claimed is:

1. A vacuum forming machine for attaching a decorative sheet onto a base member, the vacuum forming machine comprising:
   a holder including a ring-shaped member arranged to hold and grip an outer periphery of the decorative sheet;
   upper and lower boxes separated by the decorative sheet and the holder;
   a pressure reducer arranged to reduce pressures inside the upper and lower boxes;

a first valve arranged to adjust a degree of pressure reduction inside the upper box;

a second valve arranged to adjust a degree of pressure reduction inside the lower box;

a heater arranged to heat the decorative sheet;

a temperature information collector including a temperature sensor arranged to directly detect a temperature of the decorative sheet;

a pressure information collector including a plurality of pressure sensors arranged to sense the pressures inside the upper and lower boxes; and a controller programmed to control the opening/closing operations of the first and second valves based on the temperature of the decorative sheet and the pressures inside the upper and lower boxes while the pressure reducer is operating.

2. The vacuum forming machine of claim 1, wherein the controller is programmed to perform a first type of control that sets the pressure inside the lower box to be higher than the pressure inside the upper box, and the controller is programmed to start to perform the first type of control after at least one of the pressures inside the upper and lower boxes has been reduced by the pressure reducer to less than a predefined pressure and when or before the temperature of the decorative sheet that has been raised by the heater reaches a first preset temperature, and to continue to perform the first type of control until the temperature of the decorative sheet reaches a second preset temperature that is higher than the first preset temperature.

3. The vacuum forming machine of claim 2, wherein the controller is programmed to perform the first type of control by increasing the degree of opening of the first valve and/or decreasing the degree of opening of the second valve compared to their respective degrees of opening before the first type of control is started.

4. The vacuum forming machine of claim 2, wherein the controller is programmed to perform the first type of control so that the pressure inside the lower box becomes higher than the pressure inside the upper box by no less than about 0.05 kPa and no more than about 0.3 kPa.

5. The vacuum forming machine of claim 2, wherein the controller is programmed to perform a second type of control so that a pressure difference between the upper and lower boxes becomes equal to or smaller than a predetermined value since the pressures have started to be reduced by the pressure reducer and until the first type of control is started.

6. The vacuum forming machine of claim 5, wherein the controller is programmed to perform the second type of control so that the pressure difference between the upper and lower boxes becomes equal to or smaller than about 3 kPa.

7. The vacuum forming machine of claim 2, wherein the decorative sheet includes a decoration layer and a sheet base member arranged to support the decoration layer, and the first temperature either falls within the range of approximately 20° C. through (Tg+20) ° C., where Tg ° C. is the glass transition temperature of the sheet base member as measured by differential thermal analysis, or is such a temperature that makes the storage modulus E' of the sheet base member, which is estimated by dynamic viscoelasticity measurement as defined by ISO 6721, fall within the range of about 10 kPa through about 100 MPa.

8. The vacuum forming machine of claim 2, wherein after completing the first type of control, the controller is programmed to perform a third type of control so that the pressure inside the upper box becomes higher than the pressure inside the lower box.

9. The vacuum forming machine of claim 2, wherein the decorative sheet includes a decoration layer and a sheet base member arranged to support the decoration layer, and the second temperature falls within the range of approximately (Tg+25) ° C. through (Tg+70) ° C., where Tg ° C. is the glass transition temperature of the sheet base member as measured by differential thermal analysis.

10. The vacuum forming machine of claim 1, wherein the first and second valves are motor valves.

* * * * *